US012625575B2

(12) United States Patent
Kim et al.

(10) Patent No.: US 12,625,575 B2
(45) Date of Patent: May 12, 2026

(54) ELECTRONIC DEVICE INCLUDING DISPLAY LAYER AND SENSOR LAYER

(71) Applicant: Samsung Display Co., Ltd., Yongin-Si (KR)

(72) Inventors: Hyungbae Kim, Yongin-si (KR); Sanghyun Lim, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/934,241

(22) Filed: Nov. 1, 2024

(65) Prior Publication Data

US 2025/0231633 A1      Jul. 17, 2025

(30) Foreign Application Priority Data

Jan. 17, 2024      (KR) ........................ 10-2024-0007504

(51) Int. Cl.
*G06F 3/041* (2006.01)
*G06F 3/044* (2006.01)

(52) U.S. Cl.
CPC ........ *G06F 3/0412* (2013.01); *G06F 3/04164* (2019.05); *G06F 3/0446* (2019.05)

(58) Field of Classification Search
CPC .. G06F 3/0412; G06F 3/04164; G06F 3/0446; G06F 3/0448
See application file for complete search history.

(56) References Cited

U.S. PATENT DOCUMENTS 8,228,312 B2      7/2012  Matsubara
2025/0004601 A1*    1/2025  Kim ...................... G06F 3/0412

* cited by examiner

*Primary Examiner* — Deeprose Subedi
(74) *Attorney, Agent, or Firm* — Innovation Counsel LLP

(57) ABSTRACT

An electronic device includes a sensor layer including a sensing region and a peripheral region adjacent to the sensing region, which are defined therein. The sensor layer includes a plurality of first electrodes, a plurality of second electrodes, a plurality of first trace lines electrically connected to the plurality of first electrodes in a one-to-one correspondence, a plurality of second trace lines electrically connected to the plurality of second electrodes in a one-to-one correspondence, and a first loop trace line electrically connected to one second electrode among the plurality of second electrodes. A first closed loop includes one second trace line among the plurality of second trace lines connected to the one second electrode and the first loop trace line may be defined in the sensor layer.

19 Claims, 18 Drawing Sheets

ELECTRONIC DEVICE INCLUDING DISPLAY LAYER AND SENSOR LAYER

CROSS-REFERENCE TO RELATED APPLICATIONS

This U.S. non-provisional patent application claims priority under 35 U.S.C. § 119 of Korean Patent Application No. 10-2024-0007504, filed on Jan. 17, 2024, the entire contents of which are hereby incorporated by reference.

BACKGROUND

The present disclosure relates to an electronic device with improved sensing sensitivity.

Multimedia electronic devices such as televisions, mobile phones, tablet computers, laptops, navigation systems, and game consoles include display devices for displaying images. Electronic devices may include a sensor layer (or input sensor) capable of providing a touch-based input method that allows a user to easily, intuitively, and conveniently input information or commands in addition to typical input methods such as a button, a keyboard, and a mouse. The sensor layer may sense a touch or pressure of a user. There is an increasing demand for the use of a pen for a user accustomed to inputting information by using a writing instrument or for a detailed touch input for specific application programs (for example, application programs for sketching or drawing).

SUMMARY

The present disclosure may provide an electronic device with improved sensing sensitivity.

An embodiment of the inventive concept provides an electronic device including a sensor layer including a sensing region and a peripheral region adjacent to the sensing region, which are defined therein, wherein the sensor layer includes a plurality of first electrodes disposed in the sensing region and arranged along a first direction, a plurality of second electrodes disposed in the sensing region and arranged along a second direction crossing the first direction, a plurality of first trace lines electrically connected to the plurality of first electrodes in a one-to-one correspondence, a plurality of second trace lines electrically connected to the plurality of second electrodes in a one-to-one correspondence, and a first loop trace line electrically connected to one second electrode among the plurality of second electrodes, wherein a first closed loop includes a second trace line among the plurality of second trace lines connected to the one second electrode, and the first loop trace line may be defined in the sensor layer.

In an embodiment, the one second trace line and the first loop trace line may be electrically connected to one pad.

In an embodiment, the one second trace line may be disposed in the peripheral region, and the first loop trace line may be disposed in the sensing region.

In an embodiment, the one second trace line and the first loop trace line may be disposed in the peripheral region.

In an embodiment, the one second trace line may be spaced apart from the sensing region with the first loop trace line interposed therebetween.

In an embodiment, the one second trace line may be spaced apart from the first loop trace line with the sensing region interposed therebetween.

In an embodiment, the sensor layer may further include a second loop trace line electrically connected to another second electrode among the plurality of second electrodes, and a second closed loop may be defined by a second trace line among the plurality of second trace lines connected to the another second electrode, the another second electrode, and the second loop trace line.

In an embodiment, the sensor layer may further include a plurality of pads electrically connected to the plurality of first trace lines and the plurality of second trace lines, wherein the plurality of pads may be arranged along the first direction.

In an embodiment, the one second electrode may extend along the first direction.

In an embodiment, the sensor layer may further include a plurality of pads electrically connected to the plurality of first trace lines and the plurality of second trace lines, wherein the one second electrode may be extend in a direction crossing an arrangement direction of the plurality of pads.

In an embodiment, the first loop trace line may be disposed on a layer different from that of the plurality of second trace lines.

In an embodiment, the electronic device may further include a display layer disposed below the sensor layer, and a charging coil disposed below the display layer, wherein the charging coil may overlap the first closed loop.

In an embodiment of the inventive concept, an electronic device includes: a display panel including a display layer configured to display an image and a sensor layer disposed on the display layer and including a sensing region and a peripheral region adjacent to the sensing region, which are defined therein; and a charging coil disposed below the display panel, wherein the sensor layer includes a plurality of first electrodes disposed in the sensing region and arranged along a first direction, a plurality of second electrodes disposed in the sensing region and arranged along a second direction crossing the first direction, and a plurality of trace lines connected to the plurality of first electrodes and the plurality of second electrodes in a one-to-one correspondence, wherein a closed loop including one trace line among the plurality of trace lines may be defined in the sensor layer.

In an embodiment, the closed loop may overlap the charging coil.

In an embodiment, the sensor layer may further include a loop trace line electrically connected to the one trace line, and the closed loop may include the loop trace line.

In an embodiment, the one trace line may be disposed in the peripheral region, and the loop trace line may be disposed in the sensing region.

In an embodiment, the one trace line may be spaced apart from the sensing region with the loop trace line interposed therebetween.

In an embodiment, the one trace line may be spaced apart from the loop trace line with the sensing region interposed therebetween.

In an embodiment of the inventive concept, an electronic device includes a display panel including a display layer and a sensor layer disposed on the display layer and a charging coil disposed below the display panel, wherein the sensor layer includes a plurality of first electrodes arranged along a first direction, a plurality of second electrodes arranged along a second direction crossing the first direction, and a loop trace line electrically connected to one electrode among the plurality of first electrodes and the plurality of second electrodes, wherein a closed loop overlapping the charging coil may be defined in the sensor layer, and the closed loop may include the loop trace line.

In an embodiment, the sensor layer may further include a plurality of first trace lines electrically connected to the plurality of first electrodes in a one-to-one correspondence and a plurality of second trace lines electrically connected to the plurality of second electrodes in a one-to-one correspondence, and the closed loop may further include a trace line among the plurality of first trace lines and the plurality of second trace lines electrically connected to the one electrode.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1A:
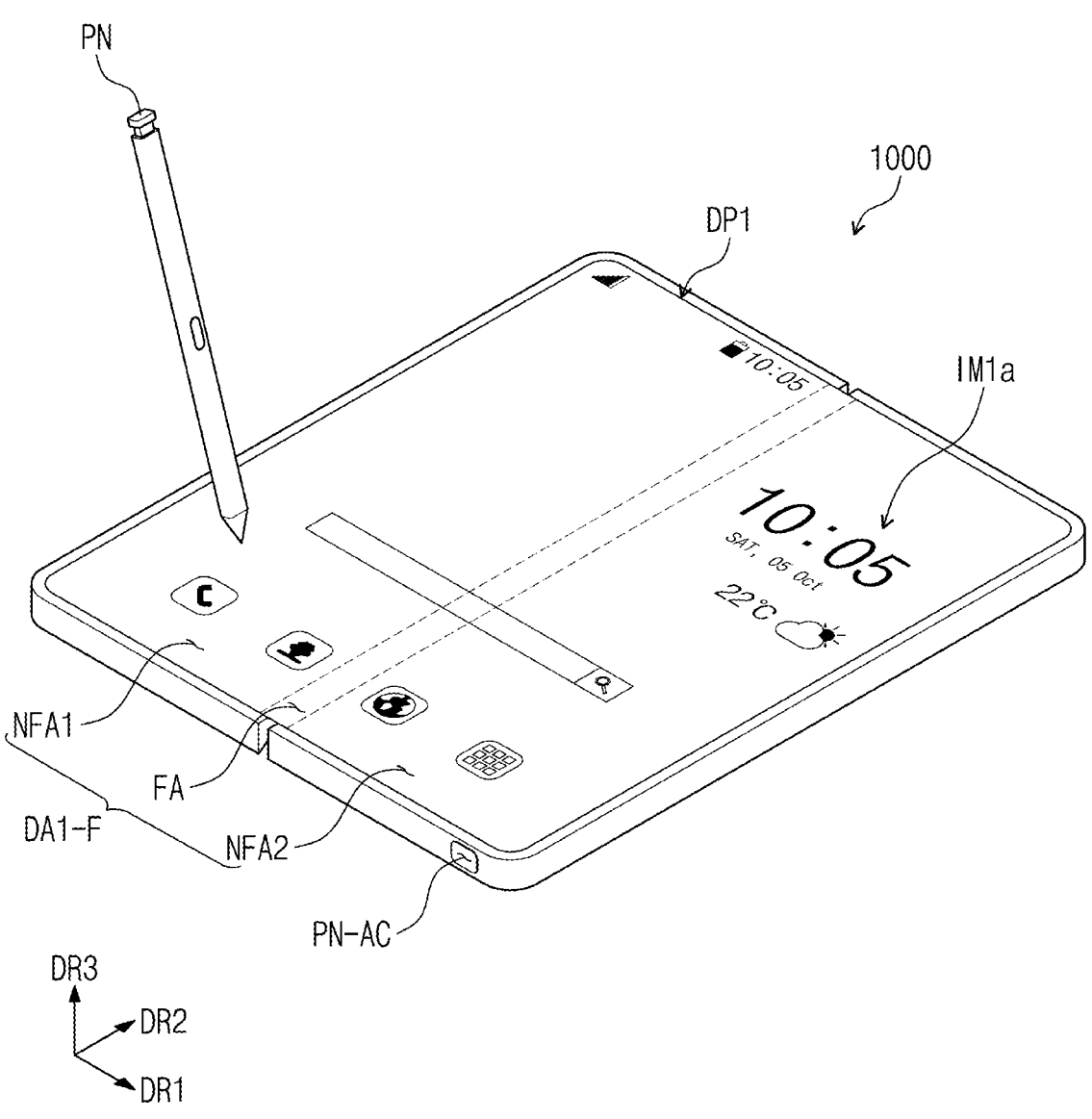
FIG. 1A is a perspective view of an electronic device according to an embodiment of the inventive concept.

In this specification, it will be understood that when an element (or region, layer, portion, etc.) is referred to as being "on", "connected to" or "coupled to" another element, it can be directly on, connected or coupled to the other element, or intervening elements may be present between them.

Like reference numerals refer to like elements throughout. In addition, in the drawings, the thicknesses, ratios, and dimensions of elements are exaggerated for effective description of the technical contents. As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

It will be understood that, although the terms first, second, etc. may be used herein to describe various elements, these elements should not be limited by these terms. These terms are only used to distinguish one element from another element. For example, a first element could be termed a second element without departing from the scope of the present invention. Similarly, the second element may also be referred to as the first element. The terms of a singular form include plural forms unless otherwise specified.

In addition, terms, such as "below", "lower", "above", "upper" and the like, are used herein for ease of description to describe one element's relation to another element(s) as illustrated in the figures. The above terms are relative concepts and are described based on the directions indicated in the drawings.

It will be understood that the terms "comprise," "include," and "have" (as well as their variations such as "comprising"), when used in this specification, specify the presence of stated features, integers, steps, operations, elements, components or groups thereof, but do not preclude the presence or addition of one or more other features, integers, steps, operations, elements, components, or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as including a meaning that is consistent with their meaning in the context of the relevant art and will not be interpreted in an idealized or overly formal sense unless expressly so defined herein.

The term "part" or "unit" refers to a software component or hardware component that performs a specific function. The hardware component may include, for example, a field-programmable gate array (FPGA) or an application-specific integrated circuit (ASIC). The software component may refer to an executable code or data used by the executable code in an addressable storage medium. Accordingly, the software component may be, for example, an object-oriented software component, a class component, and a task component, and may include processes, functions, attributes, procedures, subroutines, program code segments, drivers. firmware, micro codes, circuits, data, databases, data structures, tables, arrays or variables.

Hereinafter, embodiments of the inventive concept will be described with reference to the drawings.

Figure 1B:
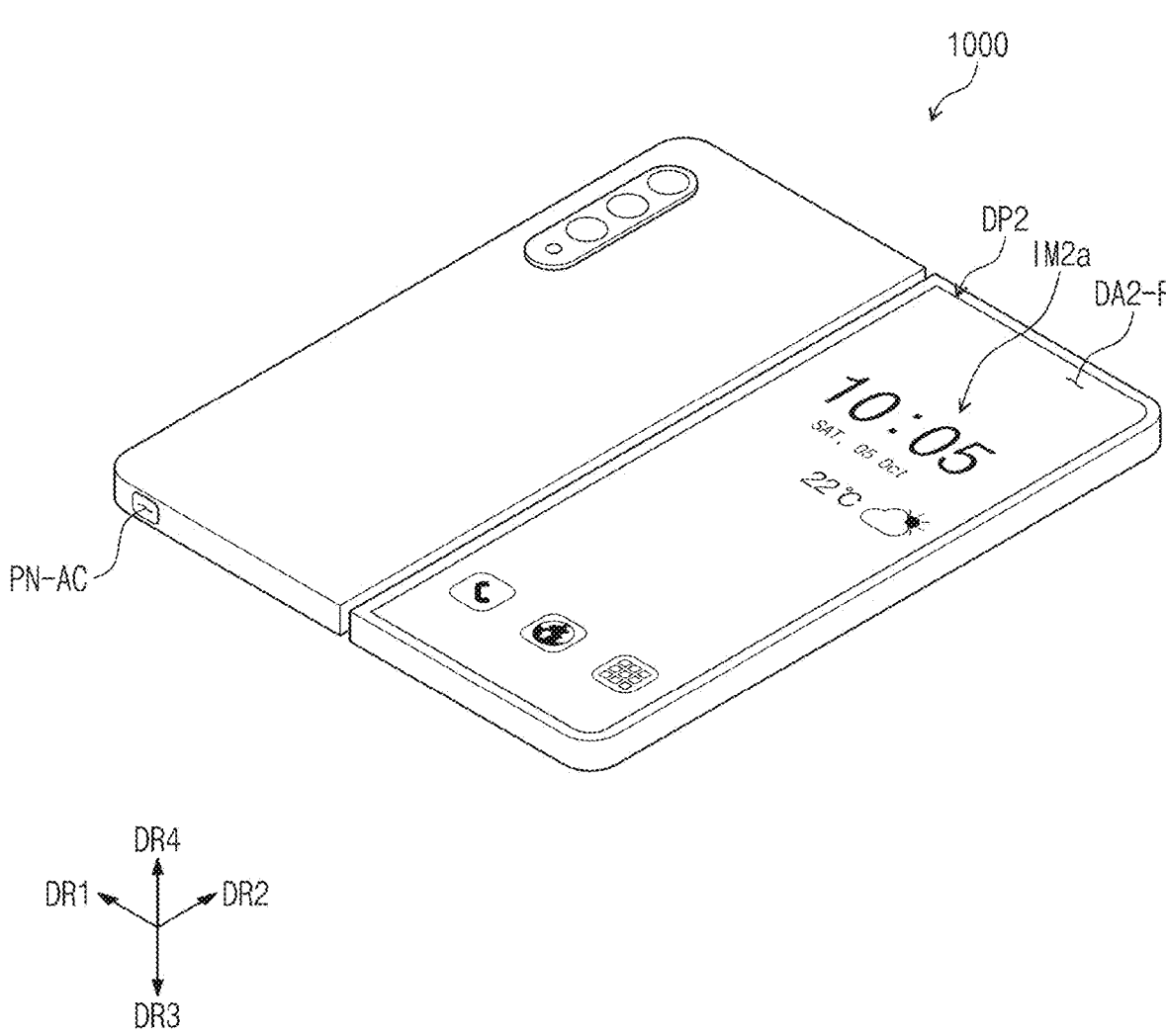
FIG. 1B is a perspective view of a rear surface of the electronic device according to an embodiment of the inventive concept.

FIG. 1A is a perspective view of an electronic device 1000 according to an embodiment of the inventive concept. FIG. 1B is a perspective view of the rear surface of the electronic device 1000 according to an embodiment of the inventive concept.

Referring to FIGS. 1A and 1B, the electronic device 1000 may be activated according to an electrical signal. For example, the electronic device 1000 may display an image and sense an input applied from the outside. An external input may be a user's input. The user's input may include various types of external inputs, such as a part of the user's body, a pen PN, light, heat, or pressure.

The electronic device 1000 may include a first display panel DP1 and a second display panel DP2. The first display panel DP1 and the second display panel DP2 may be separate panels. The first display panel DP1 may be referred to as a main display panel, and the second display panel DP2 may be referred to as an auxiliary display panel or an external display panel.

The first display panel DP1 may include a first display part DA1-F, and the second display panel DP2 may include a second display part DA2-F. The area of the second display panel DP2 may be smaller than the area of the first display panel DP1. With regard to the first and second display parts DA1-F and DA2-F that correspond to the sizes of the first display panel DP1 and the second display panel DP2, the area of the first display part DA1-F may be larger than the area of the second display part DA2-F.

When the electronic device 1000 is unfolded, the first display part DA1-F may have a plane substantially parallel to a first direction DR1 and a second direction DR2. The thickness direction of the electronic device 1000 may be parallel to a third direction DR3 crossing the first direction DR1 and the second direction DR2. Accordingly, the front (or upper) and rear (or lower) surfaces of members constituting the electronic device 1000 may be defined based on the third direction DR3.

The first display panel DP1 or the first display part DA1-F may include a folding region FA that is folded and unfolded, and a plurality of non-folding regions NFA1 and NFA2 spaced apart from each other with the folding region FA interposed therebetween. The second display panel DP2 may overlap one of the plurality of non-folding regions NFA1 and NFA2. For example, the second display panel DP2 may overlap a first non-folding region NFA1.

The display direction of a first image IM1a displayed on a portion of the first display panel DP1, for example, the first non-folding region NFA1, and the display direction of a second image IM2a displayed on the second display panel DP2 may be opposite to each other. For example, the first image IM1a may be displayed in the third direction DR3, and the second image IM2a may be displayed in a fourth direction DR4 which is opposite to the third direction DR3.

In an embodiment of the inventive concept, the folding region FA may be bent based on a folding axis extending in a direction parallel to the long side of the electronic device 1000, for example, in a direction parallel to the second direction DR2. When the electronic device 1000 is folded, the folding region FA has a predetermined curvature and a predetermined curvature radius. The first non-folding region NFA1 and the second non-folding region NFA2 may face each other, and the electronic device 1000 may be inner-folded so that the first display part DA1-F is not exposed to the outside.

In an embodiment of the inventive concept, the electronic device 1000 may be outer-folded so that the first display part DA1-F is exposed to the outside. In an embodiment of the inventive concept, the electronic device 1000 may be capable of being inner-folded or outer-folded in an unfolded state, but the embodiment of the inventive concept is not limited thereto.

FIG. 1A exemplarily illustrates that one folding region FA is defined in the electronic device 1000, but the embodiment of the inventive concept is not limited thereto. For example, a plurality of folding axes and a plurality of folding regions corresponding thereto may be defined in an electronic device

1000-1, and the electronic device 1000 may be inner-folded or outer-folded in an unfolded state in each of the plurality of folding regions.

According to an embodiment of the inventive concept, the electronic device 1000 may be provided (defined, included, or formed) with a storage slot PN-AC for storing a pen PN. The pen PN can be inserted and stored inside the storage slot PN-AC. In this case, a user may easily carry the pen PN by storing it in the electronic device 1000. In an embodiment of the inventive concept, the electronic device 1000 may further include a charging coil for charging the pen PN or a charging coil for wirelessly charging the electronic device 1000.

Figure 2:
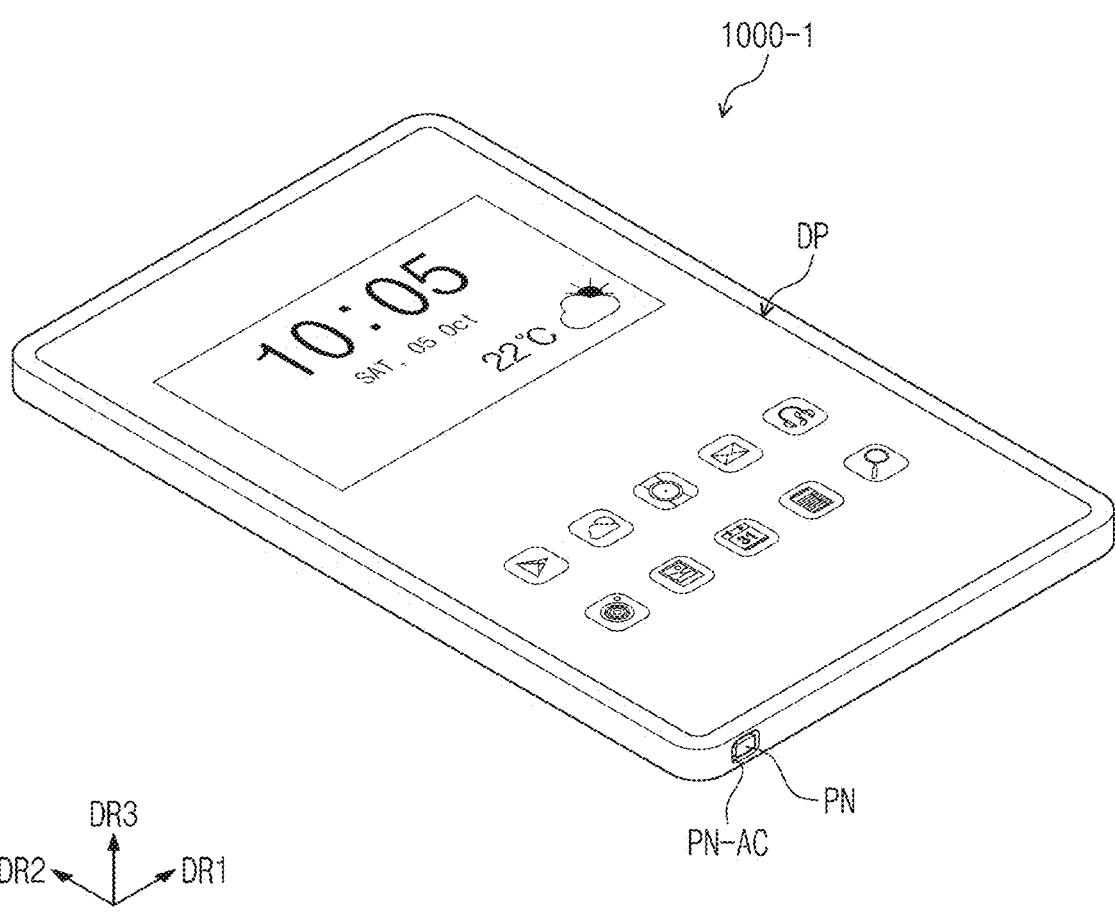
FIG. 2 is a perspective view of an electronic device according to an embodiment of the inventive concept.

FIG. 2 is a perspective view of an electronic device 1000-1 according to an embodiment of the inventive concept.

FIG. 2 exemplarily illustrates that the electronic device 1000-1 is a bar-type mobile phone (or tablet), and the electronic device 1000-1 may include a display panel DP.

In an embodiment of the inventive concept, the display panel DP may sense an input applied from the outside. An external input may be a user's input. The user's input may include various types of external inputs, such as a part of the user's body, a pen PN (see FIG. 1A), light, heat, or pressure.

According to an embodiment of the inventive concept, the electronic device 1000-1 may be provided with a storage slot PN-AC to store a pen PN. The pen PN may be inserted and stored inside the storage slot PN-AC. While the pen PN is stored in the storage slot PN-AC, the pen PN may be charged by a charging coil included in the electronic device 1000-1.

FIG. 1A exemplarily illustrates a foldable-type electronic device 1000, and FIG. 2 exemplarily illustrates a bar-type electronic device 1000-1, but the present invention described below is not limited thereto. For example, the descriptions provided below may be applied to various electronic devices, such as a rollable-type electronic device, a slidable-type electronic device, and a stretchable-type electronic device.

Figure 3A:
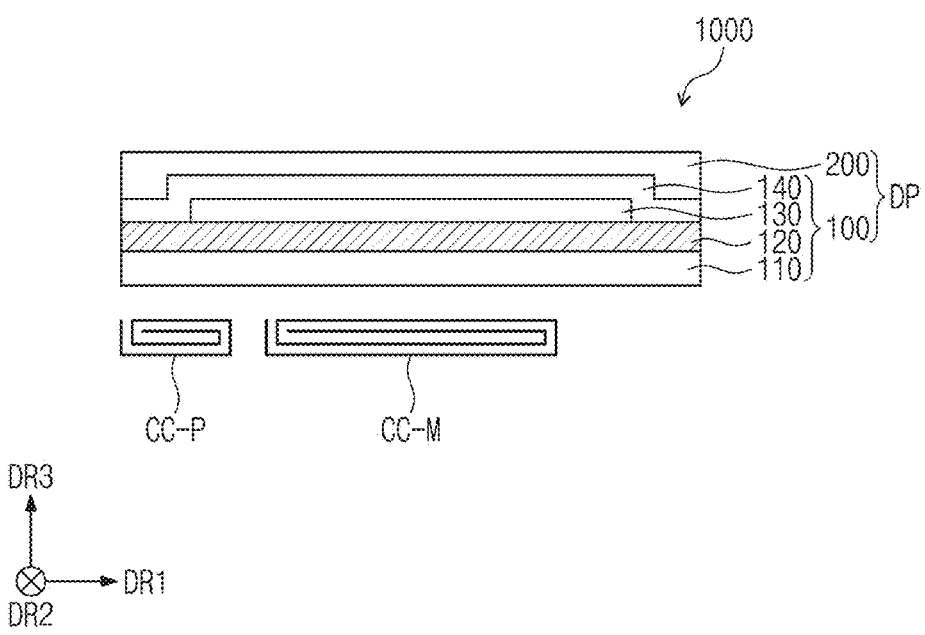
FIG. 3A is a schematic cross-sectional view of the electronic device according to an embodiment of the inventive concept.

FIG. 3A is a schematic cross-sectional view of the electronic device 1000 according to an embodiment of the inventive concept.

Referring to FIG. 3A, the electronic device 1000 may include a display panel DP, a first charging coil CC-P, and a second charging coil CC-M.

The display panel DP may include a display layer 100 and a sensor layer 200.

The display layer 100 may be configured to substantially generate an image. The display layer 100 may be a light-emitting display layer. For example, the display layer 100 may include an organic light-emitting display layer, an inorganic light-emitting display layer, an organic-inorganic light-emitting display layer, a quantum dot display layer, a micro LED display layer, or a nano LED display layer. The display layer 100 may include a base layer 110, a circuit layer 120, a light-emitting element layer 130, and an encapsulation layer 140.

The base layer 110 may be a member that provides a base surface on which the circuit layer 120 is disposed. The base layer 110 may have a multi-layered structure or a single-layered structure. The base layer 110 may be a glass substrate, a metal substrate, a silicon substrate, or a polymer substrate, but the embodiment of the inventive concept is not particularly limited thereto.

The circuit layer 120 may be disposed on the base layer 110. The circuit layer 120 may include an insulating layer, a semiconductor pattern, a conductive pattern, a signal line, and the like. An insulating layer, a semiconductor layer, and a conductive layer may be formed on the base layer 110 by coating, deposition, and the like, and the insulating layer, the semiconductor layer, and the conductive layer may be selectively patterned through a plurality of photolithography processes.

The light-emitting element layer 130 may be disposed on the circuit layer 120. The light-emitting element layer 130 may include a light-emitting element. For example, the light-emitting element layer 130 may include an organic light-emitting material, an inorganic light-emitting material, an organic-inorganic light-emitting material, a quantum dot, a quantum rod, a micro LED, or a nano LED.

The encapsulation layer 140 may be disposed on the light-emitting element layer 130. The encapsulation layer 140 may protect the light-emitting element layer 130 from moisture, oxygen, and foreign substances such as dust particles.

The sensor layer 200 may be disposed on the display layer 100. The sensor layer 200 may sense an external input applied from the outside. The sensor layer 200 may be an integrated sensor formed continuously during the manufacturing process of the display layer 100, or the sensor layer 200 may be an external sensor attached to the display layer 100. The sensor layer 200 may be referred to as a sensor, an input sensing layer, an input sensing panel, or an electronic device for sensing input coordinates.

According to an embodiment of the inventive concept, the sensor layer 200 may sense both an input by a passive input means such as a user's finger and an input by an input device that generates a magnetic field of a predetermined resonance frequency. The input device may be referred to as a pen, an input pen, a magnetic pen, a stylus pen, or an electromagnetic resonance pen. However, this is only an example and the embodiment of the inventive concept is not particularly limited thereto. The sensor layer 200 may sense an input by a passive input means such as a user's finger, and the electronic device 1000 may further include a digitizer for sensing an input by an input device that generates a magnetic field of a predetermined resonance frequency.

According to an embodiment of the inventive concept, the first charging coil CC-P and the second charging coil CC-M may be disposed below the display panel DP. For example, the first charging coil CC-P may transmit power required to charge the pen PN (see FIG. 1A). The second charging coil CC-M may receive power required to charge the electronic device 1000. However, the embodiment of the inventive concept is not particularly limited thereto, and the second charging coil CC-M may also operate as a coil for transmitting power required to charge other electronic devices. That is, the second charging coil CC-M may be a coil for transmitting and receiving power. Wireless power may be transmitted by an electromagnetic resonance method or an electromagnetic induction method, but the embodiment of the inventive concept is not particularly limited thereto.

According to an embodiment of the inventive concept, the sensor layer 200 may have a structure that attenuates or removes a noise caused by the first charging coil CC-P and the second charging coil CC-M. In this case, as a signal-to-noise ratio increases, the electronic device 1000 with improved sensing sensitivity may be provided.

Figure 3B:
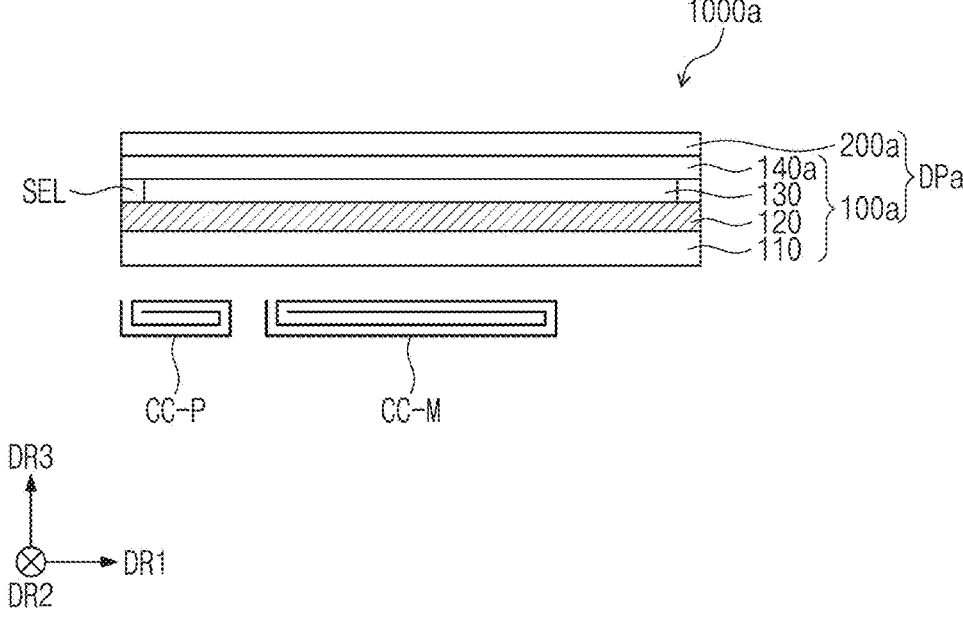
FIG. 3B is a schematic cross-sectional view of an electronic device according to an embodiment of the inventive concept.

FIG. 3B is a schematic cross-sectional view of an electronic device 1000a according to an embodiment of the inventive concept.

Referring to FIG. 3B, the electronic device 1000a may include a display panel DPa, a first charging coil CC-P, and a second charging coil CC-M. The display panel DPa may include a display layer 100a and a sensor layer 200a.

The display layer 100a may include a base layer 110, a circuit layer 120, a light-emitting element layer 130, an encapsulation substrate 140a, and a coupling member SEL.

The encapsulation substrate 140a may be disposed on the light-emitting element layer 130. The encapsulation substrate 140a may be coupled to the circuit layer 120 or the base layer 110 through the coupling member SEL to protect the light-emitting element layer 130 from moisture, oxygen, and foreign substances such as dust particles. The encapsulation substrate 140a may be a rigid substrate or a glass substrate. However, the embodiment of the inventive concept is not particularly limited thereto. For example, the encapsulation substrate 140a may include a light-transmissive material.

The sensor layer 200a may be disposed on the encapsulation substrate 140a. After the sensor layer 200a is formed on the encapsulation substrate 140a, the encapsulation substrate 140a may be coupled to the circuit layer 120 or the base layer 110. However, the embodiment of the inventive concept is not particularly limited thereto. For example, after the encapsulation substrate 140a is coupled to the circuit layer 120 or the base layer 110, the sensor layer 200a may be formed.

According to an embodiment of the inventive concept, the sensor layer 200a may have a structure that attenuates or removes a noise caused by the first charging coil CC-P and the second charging coil CC-M. In this case, as a signal-to-noise ratio increases, the electronic device 1000a with improved sensing sensitivity may be provided.

Figure 4A:
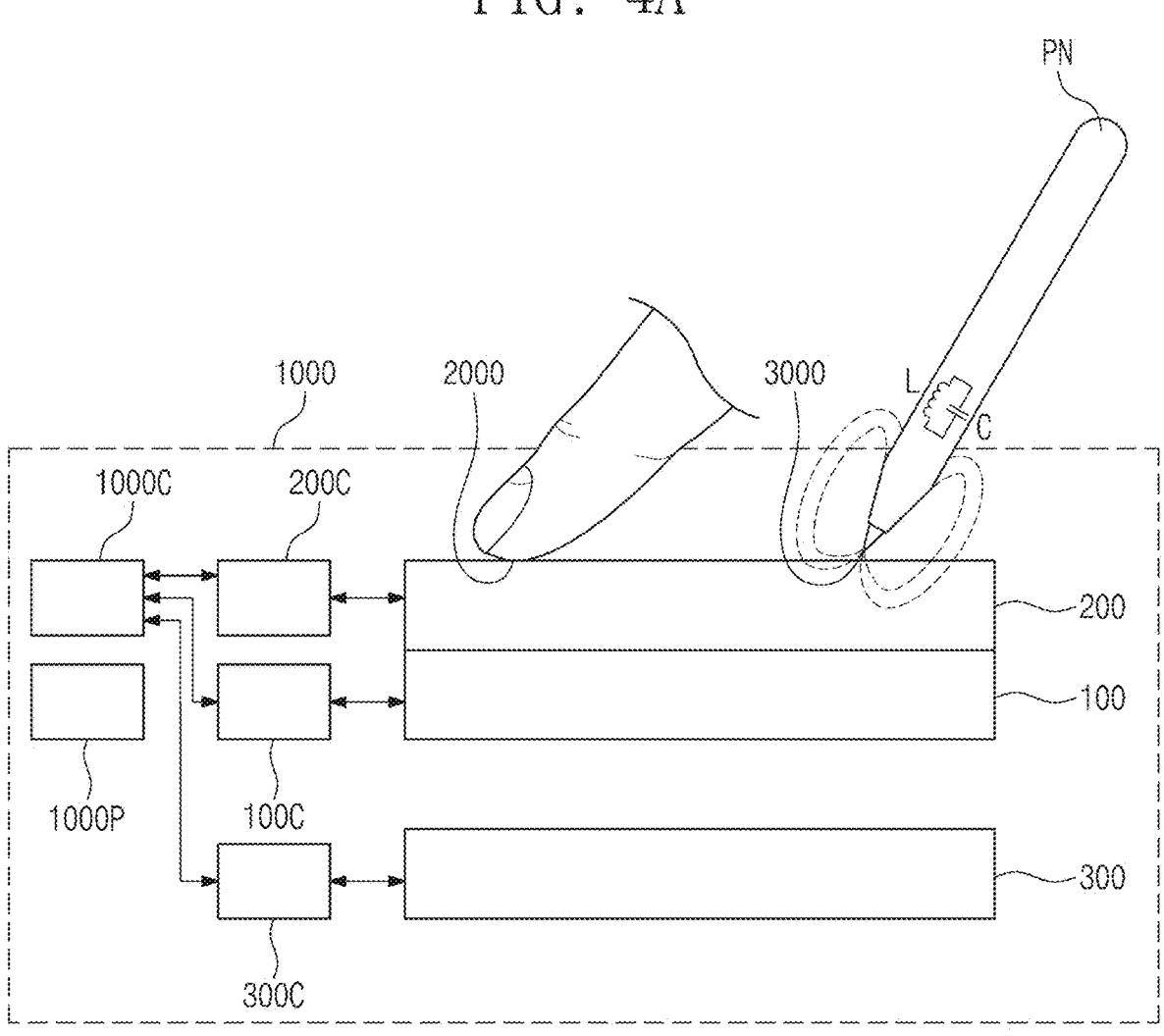
FIG. 4A describes the operation of the electronic device according to an embodiment of the inventive concept.

FIG. 4A describes the operation of the electronic device 1000 according to an embodiment of the inventive concept.

Referring to FIG. 4A, the electronic device 1000 may include a display layer 100, a sensor layer 200, a digitizer 300, a display driver 100C, a sensor driver 200C, a digitizer driver 300C, a main driver 1000C, and a power circuit 1000P.

The sensor layer 200 may sense a first input 2000 applied from the outside. The first input 2000 may be an input means capable of providing a change in the capacitance of the sensor layer 200. For example, the first input 2000 may be a passive input means such as a user's finger.

The digitizer 300 may sense a second input 3000 applied from the outside. The second input 3000 may be an input means that may cause an induced current in the digitizer 300. The second input 3000 may be an input by a pen PN or an RFIC tag. For example, the pen PN may be a passive-type pen or an active-type pen.

In an embodiment of the inventive concept, the pen PN may generate a magnetic field of a predetermined resonance frequency. The pen PN may be configured to transmit an output signal based on an electromagnetic resonance method. The pen PN may be referred to as an input device, an input pen, a magnetic pen, a stylus pen, or an electromagnetic resonance pen.

The pen PN may include an RLC resonance circuit, and the RLC resonance circuit may include an inductor L and a capacitor C. In an embodiment of the inventive concept, the RLC resonance circuit may be a variable resonance circuit that varies a resonance frequency. In this case, the inductor L may be a variable inductor or the capacitor C may be a variable capacitor, but the embodiment of the inventive concept is not particularly limited thereto.

The inductor L generates a current by a magnetic field formed in the electronic device 1000, for example, the digitizer 300. However, the embodiment of the inventive concept is not particularly limited thereto. For example, when the pen PN operates as an active type, the pen PN may generate a current although the pen PN does not receive a magnetic field from the outside. The generated current is transmitted to the capacitor C. The capacitor C is charged with the current input from the inductor L and discharges the charged current to the inductor L. Hereafter, the inductor L may emit a magnetic field of a resonance frequency. An induced current may flow in the sensor layer 200 or the digitizer 300 due to a magnetic field emitted by the pen PN, and the induced current may be transmitted to the sensor driver 200C as a reception signal (or sensing signal).

The main driver 1000C may control the overall operation of the electronic device 1000. For example, the main driver 1000C may control the operation of the display driver 100C and the sensor driver 200C. The main driver 1000C may include at least one microprocessor and may further include a graphic controller. The main driver 1000C may be referred to as an application processor, a central processing unit, or a main processor.

The display driver 100C may drive the display layer 100. The display driver 100C may receive image data and control signals from the main driver 1000C. The control signals may include various signals. For example, the control signals may include an input vertical synchronization signal, an input horizontal synchronization signal, a main clock signal, a data enable signal, and the like.

The sensor driver 200C may drive the sensor layer 200. The sensor driver 200C may receive a control signal from the main driver 1000C. The control signal may include a clock signal of the sensor driver 200C. The digitizer driver 300C may drive the digitizer 300.

Each of the sensor driver 200C and the digitizer driver 300C may be implemented as an integrated circuit (IC) and electrically connected to the sensor layer 200 and the digitizer 300. For example, each of the sensor driver 200C and the digitizer driver 300C may be mounted directly on a predetermined region of the display panel or mounted on a separate printed circuit board by a chip on film (COF) method so as to be electrically connected to the sensor layer 200.

The sensor driver 200C may calculate the coordinate information of an input, based on a signal received from the sensor layer 200, and may provide a coordinate signal including the coordinate information to the main driver 1000C. In addition, the digitizer driver 300C may calculate the coordinate information of an input, based on a signal received from the digitizer 300 and provide the main driver 1000C with a coordinate signal including the coordinate information.

The main driver 1000C executes an operation corresponding to a user's input, based on the coordinate signal. For example, the main driver 1000C may operate the display driver 100C so that a new application image is displayed on the display layer 100.

The power circuit 1000P may include a power management integrated circuit (PMIC). The power circuit 1000P may generate a plurality of driving voltages for driving the display layer 100, the sensor layer 200, the display driver 100C, and the sensor driver 200C. For example, the plurality of driving voltages may include a gate high voltage, a gate low voltage, a first driving voltage (e.g., ELVSS voltage), a second driving voltage (e.g., ELVDD voltage), an initialization voltage, and the like, but the embodiment of the inventive concept is not limited to the above examples.

Figure 4B:
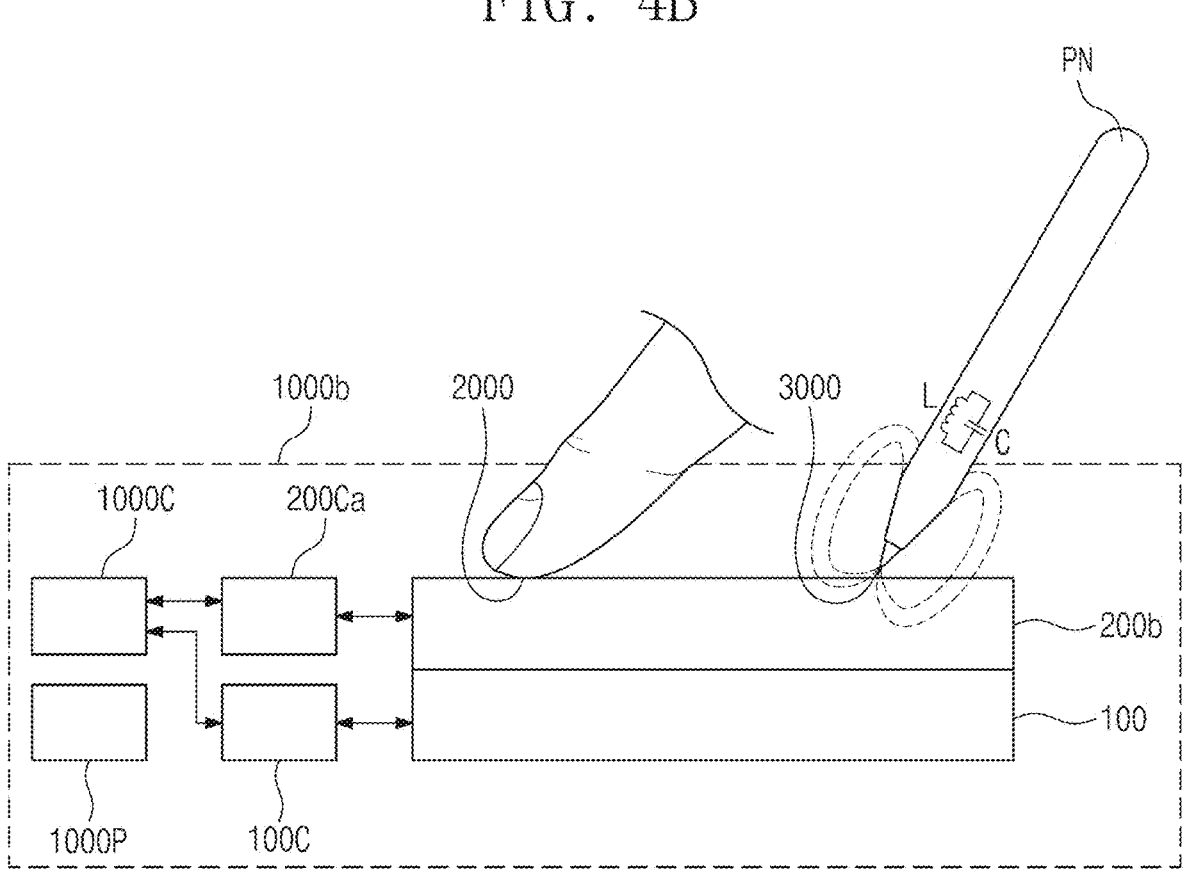
FIG. 4B describes the operation of the electronic device according to an embodiment of the inventive concept.

FIG. 4B describes the operation of the electronic device according to an embodiment of the inventive concept. In explaining FIG. 4B, the same reference numerals will be given to the same components as described in FIG. 4A and the descriptions thereof will be omitted.

Referring to FIG. 4B, the electronic device 1000b may include a display layer 100, a sensor layer 200b, a display driver 100C, a sensor driver 200Ca, a main driver 1000C, and a power circuit 1000P.

The sensor layer 200b may sense a first input 2000 or a second input 3000 applied from the outside. Each of the first input 2000 and the second input 3000 may be an input means capable of providing a change in the capacitance of the sensor layer 200, or an input means capable of causing an induced current in the sensor layer 200. For example, the first input 2000 may be a passive input means such as a user's finger. The second input 3000 may be an input by a pen PN or an RFIC tag. For example, the pen PN may be a passive-type pen or an active-type pen.

According to an embodiment of the inventive concept, which is illustrated in FIG. 4B, the electronic device 1000b may sense an input by the pen PN although it does not include a digitizer. Accordingly, since the digitizer for sensing the pen PN is omitted, the increase in thickness and weight of the electronic device 1000 and the flexibility deterioration thereof due to addition of the digitizer may not occur.

The sensor driver 200Ca and the sensor layer 200b may selectively operate in a first mode or a second mode. For example, the first mode may be a mode for sensing a touch input, for example, the first input 2000. The second mode may be a mode for sensing a pen PN input, for example, the second input 3000. The first mode may be referred to as a touch sensing mode, and the second mode may be referred to as a pen sensing mode.

Conversion between the first mode and the second mode may be carried out in a variety of ways. For example, the sensor driver 200Ca and the sensor layer 200b may be time-dividedly driven in the first mode and the second mode and may sense the first input 2000 and the second input 3000. Alternatively, conversion between the first mode and the second mode may occur due to a selection or specific action (or input) of a user, or any one of the first mode and the second mode may be activated or deactivated, or converted into the other mode by activation or deactivation of a specific application. Alternatively, while the sensor driver 200Ca and the sensor layer 200b operate alternately in the first mode and the second mode, the first mode may be maintained when the first input 2000 is sensed, or the second mode may be maintained when the second input 3000 is sensed.

Figure 5:
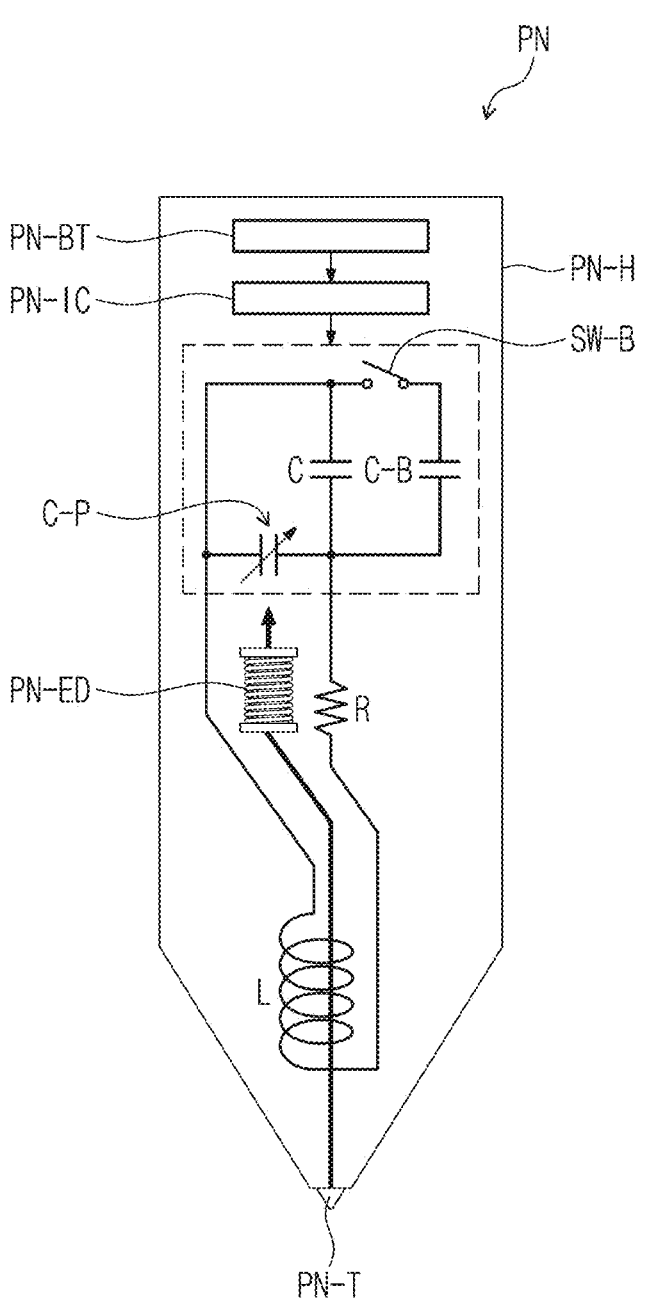
FIG. 5 illustrates a pen according to an embodiment of the inventive concept.

FIG. 5 illustrates a pen PN according to an embodiment of the inventive concept.

Referring to FIG. 5, the pen PN may include a housing PN-H, a pen tip PN-T, an inductor L, a capacitor C, a resistor R, an elastic body PN-ED, a pressure capacitor C-P, a switch SW-B, a button capacitor C-B, a power supply circuit PN-BT, and a controller PN-IC. Components included in the pen PN are not limited to the components described above. At least some of the above-described components may be omitted, and other components may be added.

In an embodiment of the inventive concept, the pen tip PN-T may include a non-conductive material. The pen tip PN-T may have a structure that protrudes from the housing PN-H. The pen tip PN-T may be detachably coupled to the housing PN-H and may be a replaceable component.

In an embodiment of the inventive concept, the resistor R, the inductor L, and the capacitor C may be connected in series with each other. Accordingly, the pen PN may have a structure including a resonance frequency and selectivity which are the characteristics of an RLC series circuit. In this case, the frequency of signals provided to the digitizer 300 (see FIG. 4A) or the sensor layer 200*b* (see FIG. 4B) during charging operation of the digitizer 300 (see FIG. 4A) or the sensor layer 200*b* (see FIG. 4B) may correspond to the resonance frequency of the pen PN. The capacitor C, the pressure capacitor C-P, and the button capacitor C-B may have a structure in which they are connected in parallel with each other. For reference, the button capacitor C-B may be connected in parallel with the capacitor C when the switch SW-B is turned on.

In an embodiment of the inventive concept, as the switch SW-B is turned on and off, the button capacitor C-B may be electrically connected to or disconnected from the capacitor C. That is, by turning the switch SW-B on and off, the pen PN may be provided so as to respond to a different resonance frequency. For example, a button may be provided on the outer circumferential surface of the housing PN-H. When the button is pressed, the switch SW-B is turned on, and the button capacitor C-B is electrically connected to the capacitor C, thus being able to increase the capacitance of the entire pen PN.

In an embodiment of the inventive concept, the capacitor C may be provided by cutting some of a plurality of capacitors connected in parallel with each other. For example, in order to match a target resonance frequency during the process of manufacturing the pen PN, the pen PN may tune the capacitor C by cutting some of a plurality of capacitors.

In an embodiment of the inventive concept, when the pen tip PN-T is partially inserted into the housing PN-H by pen pressure, the area, distance, or area and distance forming the capacitance of the pressure capacitor C-P may be changed. Accordingly, the capacitance of the pressure capacitor C-P may be changed. For example, when pen pressure is applied to the pen PN, the capacitance of the pressure capacitor C-P may increase, and corresponding thereto, the resonance frequency of the pen PN may decrease. Hereafter, when the pen pressure disappears, the capacitance of the pressure capacitor C-P may be restored to its original state by the elastic body PN-ED.

According to an embodiment of the inventive concept, the power supply circuit PN-BT may include a battery or a high-capacity capacitor. When the pen PN is stored in the electronic device 1000 (see FIG. 1A), the power supply circuit PN-BT may be charged by the first charging coil CC-P (see FIG. 3A). The controller PN-IC may receive power from the power supply circuit PN-BT and adjust the frequency of a signal output from the pen PN. In addition, the pen PN may receive power from the power supply circuit PN-BT and perform Bluetooth communication with the electronic device 1000 (see FIG. 1A) or another external device.

According to an embodiment of the inventive concept, since the pen PN includes the RLC resonance circuit, the power supply circuit PN-BT, and the controller PN-IC, the pen PN may operate as an active type as well as a passive type. Accordingly, although a magnetic field is not provided from the sensor layer 200, the pen PN may emit a magnetic field. In this case, the sensor layer 200 may sense an input from the pen PN that outputs a magnetic field without a charging mode that forms a magnetic field.

Figure 6A:
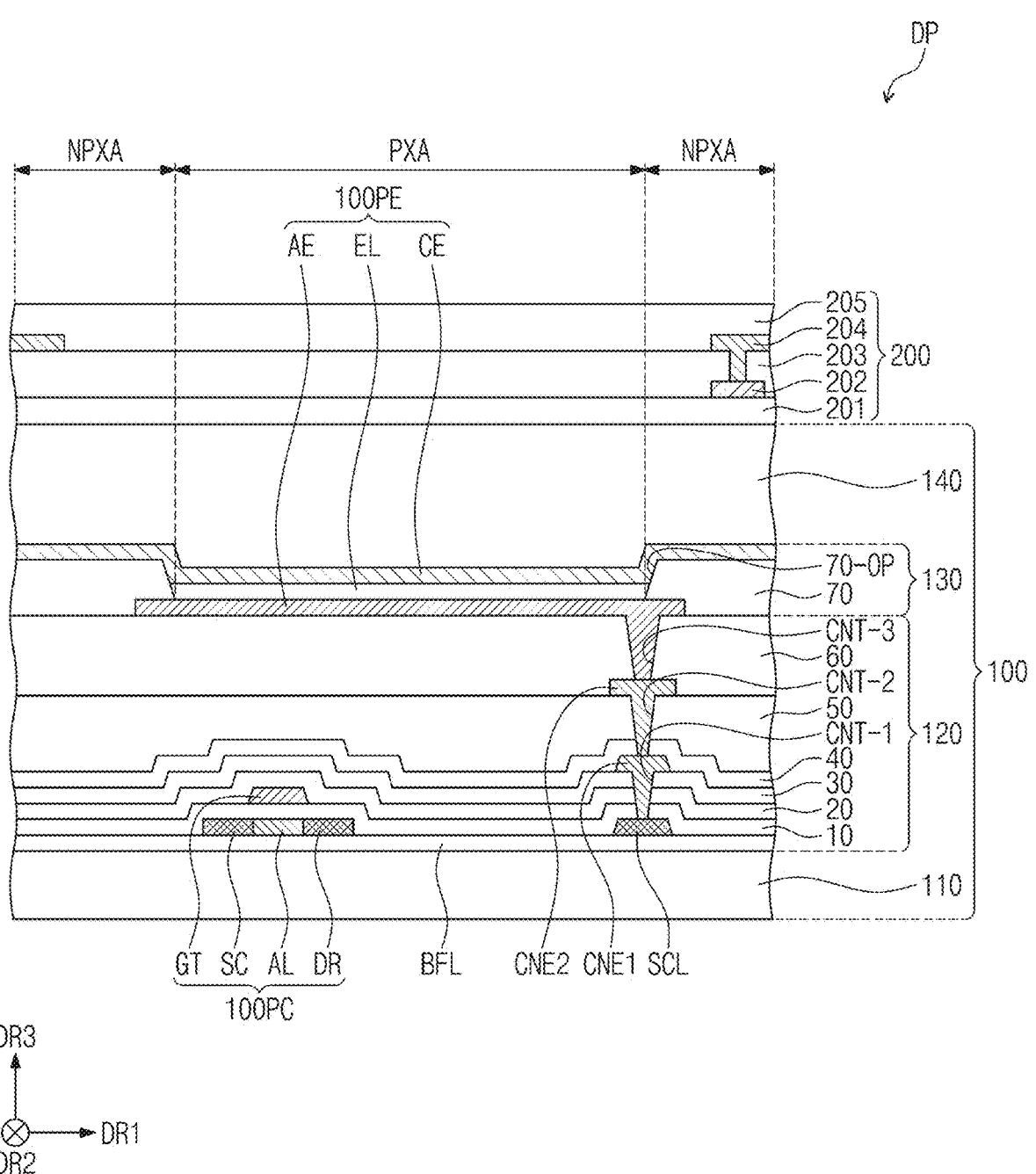
FIG. 6A is a cross-sectional view of a display panel according to an embodiment of the inventive concept.

FIG. 6A is a cross-sectional view of a display panel DP according to an embodiment of the inventive concept.

Referring to FIG. 6A, at least one buffer layer BFL is formed on the upper surface of the base layer 110. The buffer layer BFL may improve the bonding strength between the base layer 110 and the semiconductor pattern. The buffer layer BFL may be formed of multiple layers. Alternatively, the display layer 100 may further include a barrier layer. The buffer layer BFL may include at least one of silicon oxide, silicon nitride, or silicon oxynitride. For example, the buffer layer BFL may include a structure in which a silicon oxide layer and a silicon nitride layer are alternately stacked.

Semiconductor patterns SC, AL, DR, and SCL may be disposed on the buffer layer BFL. The semiconductor patterns SC, AL, DR, and SCL may include polysilicon. Without being limited thereto, however, the semiconductor patterns SC, AL, DR, and SCL may include amorphous silicon, low-temperature polycrystalline silicon, or oxide semiconductor.

FIG. 6A illustrates only some semiconductor patterns SC, AL, DR, and SCL, and additional semiconductor patterns may be disposed in other regions. The semiconductor patterns SC, AL, DR, and SCL may be arranged in a specific rule across pixels. The semiconductor patterns SC, AL, DR, and SCL may have different electrical properties depending on whether or not they are doped. The semiconductor patterns SC, AL, DR, and SCL may include a first region SC, DR, and SCL including high conductivity and a second region AL including low conductivity. The first region SC, DR, and SCL may be doped with an N-type dopant or a P-type dopant. A P-type transistor may include a doped region doped with a P-type dopant, and an N-type transistor may include a doped region doped with an N-type dopant. The second region AL may be a non-doped region or a region doped at a lower concentration than the first region SC, DR, and SCL.

The conductivity of the first region SC, DR, and SCL may be greater than that of the second region AL, and the first region SC, DR, and SCL may substantially serve as an electrode or a signal line. The second region AL may substantially correspond to an active region AL (or channel) of a transistor 100PC. In other words, a portion AL of the semiconductor patterns SC, AL, DR, and SCL may be an active region AL of the transistor 100PC, another portion SC and DR thereof may be a source region SC or drain region DR of the transistor 100PC, and still another portion SCL thereof may be a connection electrode or a connection signal line SCL.

Each of the pixels may have an equivalent circuit including a plurality of transistors, at least one capacitor, and at least one light-emitting element, and an equivalent circuit diagram of a pixel may be modified in various forms. FIG. 6A exemplarily illustrates one transistor 100PC and one light-emitting element 100PE included in the pixel.

The source region SC, the active region AL, and the drain region DR of the transistor 100PC may be formed from the semiconductor patterns SC, AL, DR, and SCL. The source region SC and the drain region DR may extend in opposite directions from each other from the active region AL on a cross section. FIG. 6A illustrates a portion of the connection signal line SCL formed from the semiconductor patterns SC, AL, DR, and SCL. Although not separately illustrated, the connection signal line SCL may be connected to the drain region DR of the transistor 100PC on a plane.

A first insulating layer 10 may be disposed on the buffer layer BFL. The first insulating layer 10 may commonly overlap a plurality of pixels and cover the semiconductor patterns SC, AL, DR, and SCL. The first insulating layer 10 may be an inorganic layer or an organic layer and have a single-layered or multi-layered structure. The first insulating layer 10 may include at least one of aluminum oxide, titanium oxide, silicon oxide, silicon nitride, silicon oxynitride, zirconium oxide, or hafnium oxide. In this embodiment, the first insulating layer 10 may be a single layer of silicon oxide. Not only the first insulating layer 10 but also the insulating layers of the circuit layer 120 to be described later may be an inorganic layer or an organic layer and have a single-layered or multi-layered structure. The inorganic layer may include at least one of the above-mentioned materials, but the embodiment of the inventive concept is not limited thereto.

A gate GT of the transistor 100PC is disposed on the first insulating layer 10. The gate GT may be a portion of a metal pattern. The gate GT overlaps the active region AL. In the process of doping or reducing the semiconductor patterns SC, AL, DR, and SCL, the gate GT may function as a mask.

A second insulating layer 20 may be disposed on the first insulating layer 10 and cover the gate GT. The second insulating layer 20 may commonly overlap the pixels. The second insulating layer 20 may be an inorganic layer or an organic layer and have a single-layered or multi-layered structure. The second insulating layer 20 may include at least one of silicon oxide, silicon nitride, or silicon oxynitride. In this embodiment, the second insulating layer 20 may have a multi-layered structure including a silicon oxide layer and a silicon nitride layer.

A third insulating layer 30 may be disposed on the second insulating layer 20. The third insulating layer 30 may have a single-layered or multi-layered structure. For example, the third insulating layer 30 may have a multi-layered structure including a silicon oxide layer and a silicon nitride layer.

A first connection electrode CNE1 may be disposed on the third insulating layer 30. The first connection electrode CNE1 may be connected to the connection signal line SCL through a contact hole CNT-1 passing through the first, second, and third insulating layers 10, 20, and 30.

A fourth insulating layer 40 may be disposed on the third insulating layer 30. The fourth insulating layer 40 may be a single layer of silicon oxide. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 passing through the fourth insulating layer 40 and the fifth insulating layer 50.

A sixth insulating layer 60 may be disposed on the fifth insulating layer 50 and at least partially cover the second connection electrode CNE2. The sixth insulating layer 60 may be an organic layer.

The light-emitting element layer 130 may be disposed on the circuit layer 120. The light-emitting element layer 130 may include a light-emitting element 100PE. For example, the light-emitting element layer 130 may include an organic light-emitting material, an inorganic light-emitting material, an organic-inorganic light-emitting material, a quantum dot, a quantum rod, a micro LED, or a nano LED. Hereinafter, the light-emitting element 100PE will be exemplarily described as an organic light-emitting element, but the embodiment of the inventive concept is not particularly limited thereto.

The light-emitting element 100PE may include a first electrode AE, a light-emitting layer EL, and a second electrode CE.

The first electrode AE may be disposed on the sixth insulating layer 60. The first electrode AE may be connected to the second connection electrode CNE2 through a contact hole CNT-3 passing through the sixth insulating layer 60.

A pixel defining film 70 may be disposed on the sixth insulating layer 60 and cover a portion of the first electrode AE. An opening 70-OP is defined in the pixel defining film 70. The opening 70-OP of the pixel defining film 70 exposes at least a portion of the first electrode AE.

The first display part DA1-F (see FIG. 1A) may include a light-emitting region PXA and a non-light-emitting region NPXA adjacent to the light-emitting region PXA. The non-light-emitting region NPXA may surround the light-emitting region PXA. In this embodiment, the light-emitting region PXA is defined to correspond to a partial region of the first electrode AE exposed by the opening 70-OP.

The light-emitting layer EL may be disposed on the first electrode AE. The light-emitting layer EL may be disposed in a region corresponding to the opening 70-OP. FIG. 6A exemplarily illustrates that the light-emitting layer EL is disposed in the opening 70-OP, but the embodiment of the inventive concept is not particularly limited thereto. For example, the light-emitting layer EL may extend so as to cover the side surfaces of the pixel defining film 70, which define the opening 70-OP, and a portion of the upper surface of the pixel defining film 70.

In an embodiment of the inventive concept, the light-emitting layer EL may be formed separately in each of the pixels. When the light-emitting layer EL is formed separately in each of the pixels, each light-emitting layer EL may emit light of at least one of blue, red, or green. However, the embodiment of the inventive concept is not limited thereto, and the light-emitting layer EL may be connected to the pixels so as to be included in common therein. In this case, the light-emitting layer EL may provide blue light or white light.

The second electrode CE may be disposed on the light-emitting layer EL. The second electrode CE may have an integral shape and be commonly included in a plurality of pixels.

In an embodiment of the inventive concept, a hole control layer may be disposed between the first electrode AE and the light-emitting layer EL. The hole control layer may be commonly disposed in the light-emitting region PXA and the non-light-emitting region NPXA. The hole control layer may include a hole transport layer and may further include a hole injection layer. An electron control layer may be disposed between the light-emitting layer EL and the second electrode CE. The electron control layer may include an electron transport layer and may further include an electron injection layer. The hole control layer and the electron control layer may be commonly formed in a plurality of pixels by using an open mask or an inkjet process.

The encapsulation layer 140 may be disposed on the light-emitting element layer 130. The encapsulation layer 140 may include an inorganic layer, an organic layer, and an inorganic layer which are sequentially stacked, but layers constituting the encapsulation layer 140 are not limited thereto. The inorganic layers may protect the light-emitting element layer 130 from moisture and oxygen, and the organic layer may protect the light-emitting element layer 130 from foreign substances such as dust particles. The inorganic layers may include a silicon nitride layer, a silicon oxynitride layer, a silicon oxide layer, a titanium oxide layer, an aluminum oxide layer, or the like. The organic layer may include an acrylic-based organic layer, but the embodiment of the inventive concept is not limited thereto.

The sensor layer 200 may include a base layer 201, a first conductive layer 202, an intermediate insulating layer 203, a second conductive layer 204, and a cover insulating layer 205.

The base layer 201 may be an inorganic layer including at least any one of silicon nitride, silicon oxy nitride, or silicon oxide. Alternatively, the base layer 201 may be an organic layer including epoxy resin, acrylic resin, or imide-based resin. The base layer 201 may have a single-layered structure or a multi-layered structure in which layers are stacked along the third direction DR3. In an embodiment of the inventive concept, the sensor layer 200 may not include a base layer 201.

Each of the first conductive layer 202 and the second conductive layer 204 may have a single-layered structure or a multi-layered structure in which layers are stacked along the third direction DR3.

Each of the first conductive layer 202 and the second conductive layer 204 which have a single-layered structure may include a metal layer or a transparent conductive layer. The metal layer may include molybdenum, silver, titanium, copper, aluminum, or alloys thereof. The transparent conductive layer may include a transparent conductive oxide such as indium tin oxide (ITO), indium zinc oxide (IZO), zinc oxide (ZnO), or indium zinc tin oxide (IZTO). In addition, the transparent conductive layer may include a conductive polymer such as poly(3,4-ethylenedioxythiophene) (PEDOT), metal nanowire, graphene, and the like.

Each of the first conductive layer 202 and the second conductive layer 204 including a multi-layered structure may include metal layers. The metal layers may have, for example, a three-layer structure of titanium/aluminum/titanium. A multi-layered conductive layer may include at least one metal layer and at least one transparent conductive layer.

In an embodiment of the inventive concept, the thickness of the first conductive layer 202 may be greater than or equal to the thickness of the second conductive layer 204. When the thickness of the first conductive layer 202 is greater than the thickness of the second conductive layer 204, the resistance of components (e.g., an electrode, a sensing pattern, a bridge pattern, or the like) included in the first conductive layer 202 may be reduced. In addition, since the first conductive layer 202 is disposed below the second conductive layer 204, a probability that components included in the first conductive layer 202 are visible due to reflection of external light may be lower than that of the second conductive layer 204 although the thickness of the first conductive layer 202 is increased.

At least any one of the intermediate insulating layer 203 or the cover insulating layer 205 may include an inorganic film. The inorganic film may include at least one of aluminum oxide, titanium oxide, silicon oxide, silicon nitride, silicon oxy nitride, zirconium oxide, or hafnium oxide.

At least any one of the intermediate insulating layer 203 or the cover insulating layer 205 may include an organic film. The organic film may include at least any one of acrylic-based resin, methacrylic-based resin, polyisoprene, vinyl-based resin, epoxy-based resin, urethane-based resin, cellulose-based resin, siloxane-based resin, polyimide-based resin, polyamide-based resin, or perylene-based resin.

Previously, it was exemplarily described that the sensor layer 200 includes the first conductive layer 202 and the second conductive layer 204, that is, a total of two conductive layers, but the embodiment of the inventive concept is not particularly limited thereto. For example, the sensor layer 200 may include three or more conductive layers.

Figure 6B:
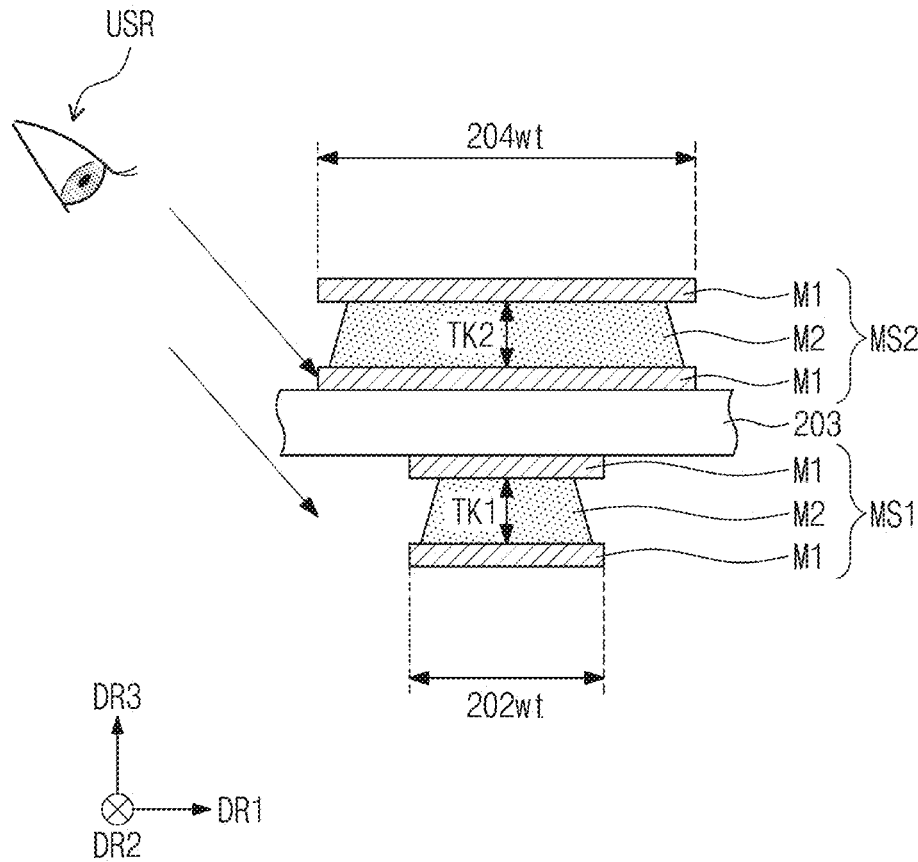
FIG. 6B is a cross-sectional view of a sensor layer according to an embodiment of the inventive concept.

FIG. 6B is a cross-sectional view of the sensor layer 200 according to an embodiment of the inventive concept.

Referring to FIGS. 6A and 6B, a second width 204wt of a second mesh line MS2 included in the second conductive layer 204 may be greater than or equal to a first width 202wt of a first mesh line MS1 included in the first conductive layer 202. When a user USR views the first mesh line MS1 and the second mesh line MS2 from a side, the first mesh line MS1 has a smaller width than the second mesh line MS2, and therefore, a probability that the first mesh line MS1 is viewed by the user USR may be reduced.

Each of the first mesh line MS1 and the second mesh line MS2 may include first metal layers M1 and a second metal layer M2 disposed between the first metal layers M1. For example, the first metal layers M1 may include titanium (Ti), and the second metal layer M2 may include aluminum (Al). However, this is only an example and the embodiment of the inventive concept is not particularly limited thereto.

In an embodiment of the inventive concept, a first thickness TK1 of the second metal layer M2 of the first mesh line MS1 and a second thickness TK2 of the second metal layer M2 of the second mesh line MS2 may be substantially the same as each other, but the embodiment of the inventive concept is not particularly limited thereto. For example, the first thickness TK1 may be greater than the second thickness TK2. Alternatively, the second thickness TK2 may be greater than the first thickness TK1. In an embodiment of the inventive concept, each of the first thickness TK1 and the second thickness TK2 may be about 1000 Angstroms or more, for example, about 6000 Angstroms.

Figure 7:
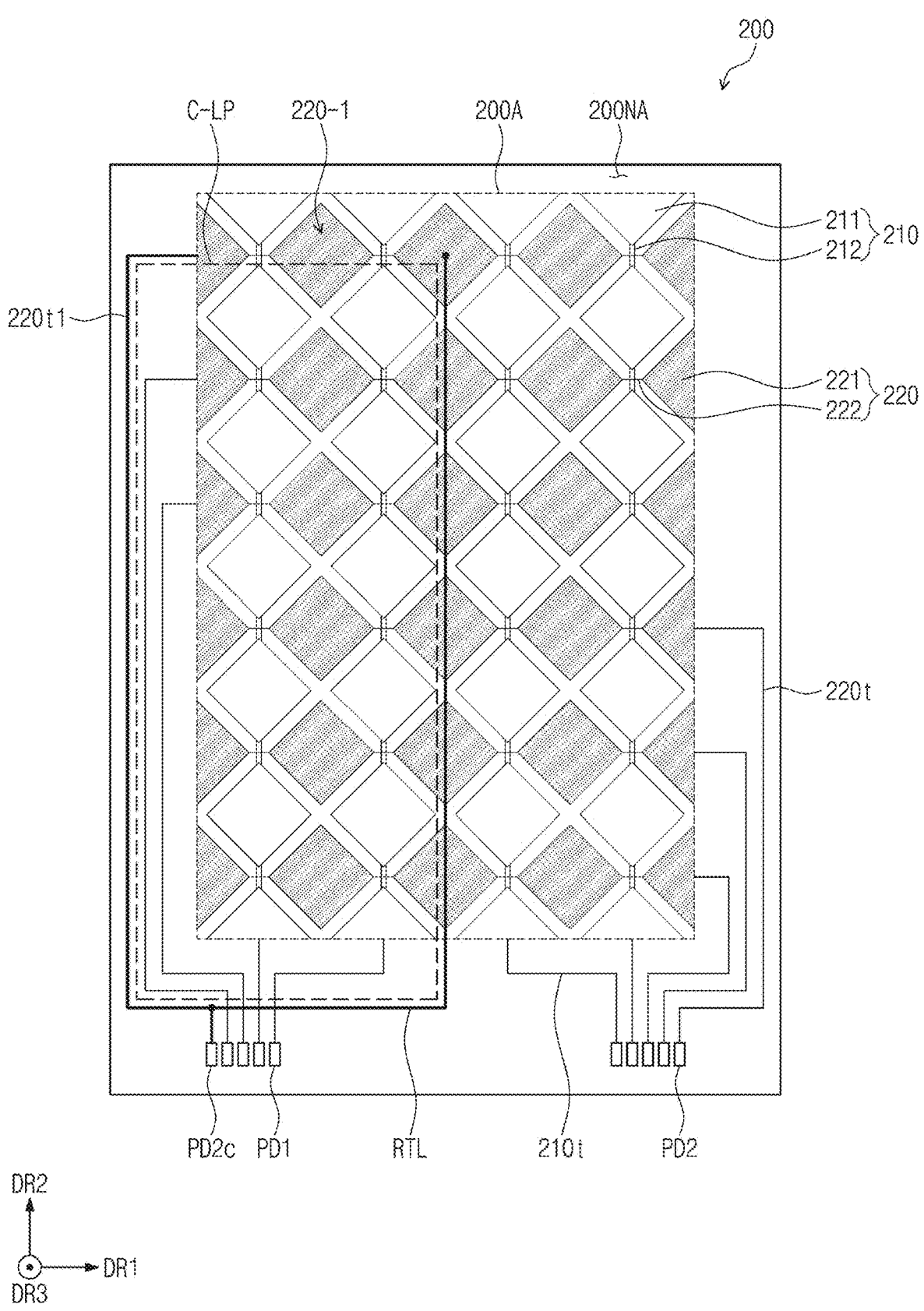
FIG. 7 is a plan view of the sensor layer according to an embodiment of the inventive concept.

FIG. 7 is a plan view of the sensor layer 200 according to an embodiment of the inventive concept.

Referring to FIG. 7, a sensing region 200A and a peripheral region 200NA adjacent to the sensing region 200A may be defined in the sensor layer 200.

The sensor layer 200 may include a plurality of first electrodes 210 and a plurality of second electrodes 220 which are disposed in the sensing region 200A.

Each of the first electrodes 210 may cross the second electrodes 220. Each of the first electrodes 210 may extend along the second direction DR2, and the first electrodes 210 may be arranged to be spaced apart from each other in the first direction DR1. Each of the second electrodes 220 may extend along the first direction DR1, and the second electrodes 220 may be arranged to be spaced apart from each other in the second direction DR2. FIG. 7 exemplarily illustrates four first electrodes 210 and six second electrodes 220, but the number of the first electrodes 210 and the number of the second electrodes 220 are not limited thereto.

Each of the first electrodes 210 may include a plurality of patterns 211 and a plurality of bridge patterns 212, and each of the second electrodes 220 may include a plurality of pattern portions 221 and a plurality of bridge portions 222. The pattern portions 221 and the bridge portions 222 included in one second electrode 220 may be connected to each other to have an integral shape.

In an embodiment of the inventive concept, the plurality of patterns 211, the plurality of pattern portions 221, and the plurality of bridge portions 222 may be disposed on the same layer as each other. For example, the plurality of patterns 211, the plurality of pattern portions 221, and the plurality of bridge portions 222 may be included in the second conductive layer 204 (see FIG. 6A). The plurality of bridge patterns 212 may be included in the first conductive layer 202 (see FIG. 6A).

In an embodiment of the inventive concept, two patterns 211 spaced apart from each other in the second direction DR2 may be electrically connected by two bridge patterns 212. However, the embodiment of the inventive concept is not particularly limited thereto. For example, two patterns 211 may be connected to each other by one bridge pattern, or two patterns 211 may be connected to each other by three or more bridge patterns. One bridge portion 222 may be insulated from and cross two overlapping bridge patterns 212.

The sensor layer 200 may further include a plurality of first trace lines 210*t*, a plurality of first pads PD1 connected to the first trace lines 210*t* in a one-to-one correspondence, a plurality of second trace lines 220*t*, and a plurality of second pads PD2 connected to the second trace lines 220*t* in a one-to-one correspondence, which are disposed in the peripheral region 200NA. The first trace lines 210*t* may be respectively electrically connected to the first electrodes 210 in a one-to-one correspondence. The second trace lines 220*t* may be respectively electrically connected to the second electrodes 220 in a one-to-one correspondence.

According to an embodiment of the inventive concept, the sensor layer 200 may have a closed loop C-LP defined therein and including one trace line 220*t*1 among the first trace lines 210*t* and the second trace lines 220*t*. For example, the sensor layer 200 may further include a loop trace line RTL electrically connected to one trace line 220*t*1 in order to define the closed loop C-LP.

In an embodiment of the inventive concept, the sensor layer 200 may further include a loop trace line RTL electrically connected to one second electrode 220-1 among the plurality of second electrodes 220. Accordingly, the sensor layer 200 may have a closed loop C-LP defined therein and including a portion of one second electrode 220-1, one second trace line 220*t*1 electrically connected to one second electrode 220-1, and a loop trace line RTL. One second trace line 220*t*1 and the loop trace line RTL may be electrically connected to one second pad PD2*c*.

In an embodiment of the inventive concept, one second trace line 220*t*1 may be disposed in the peripheral region 200NA, and the loop trace line RTL may be disposed in the sensing region 200A. Accordingly, the closed loop C-LP may overlap at least a portion of the peripheral region 200NA and at least a portion of the sensing region 200A.

In an embodiment of the inventive concept, the position of the loop trace line RTL may be changed in various ways in the sensing region 200A. Therefore, the size of the closed loop C-LP may be adjusted according to the position of the loop trace line RTL. The loop trace line RTL may be disposed on the same layer as the bridge patterns 212. For example, the loop trace line RTL may be disposed on the first conductive layer 202 (see FIG. 6A).

In an embodiment of the inventive concept, the first pads PD1 and the second pads PD2 may be arranged along the first direction DR1. The first pads PD1 may be referred to as a first plurality of pads and the second pads PD2 may be referred to as a second plurality of pads. In addition, one second electrode 220-1 may extend along the first direction DR1. That is, a closed loop C-LP electrically connected to one second electrode 220-1 extending in a direction parallel to the arrangement direction of the first and second pads PD1 and PD2 may be defined.

Figure 8:
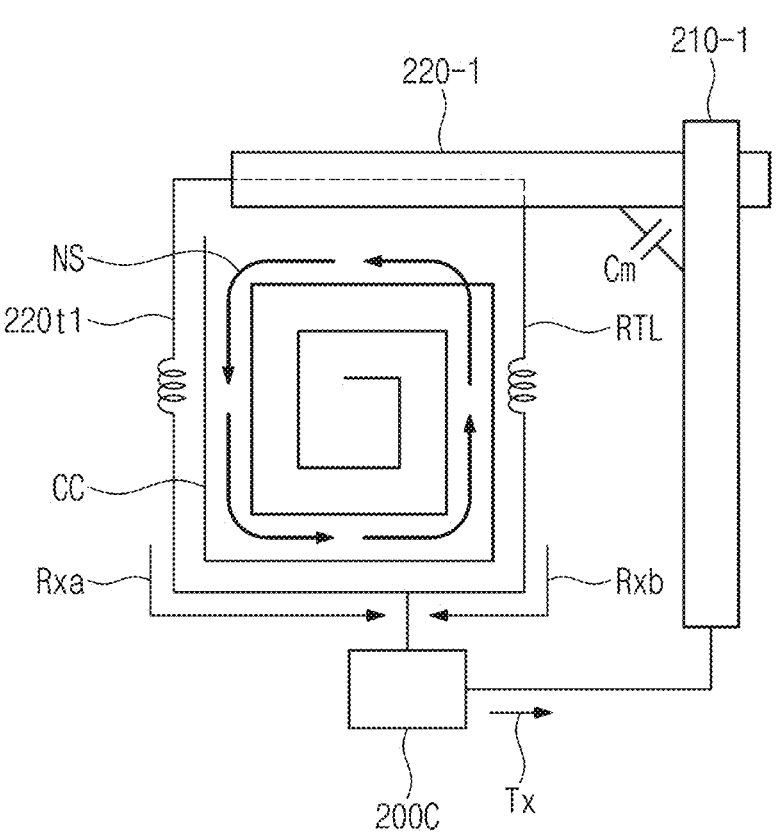
FIG. 8 illustrates a partial configuration of the sensor layer and a charging coil according to an embodiment of the inventive concept.

FIG. 8 illustrates a partial configuration of the sensor layer 200 (see FIG. 7) and a charging coil CC according to an embodiment of the inventive concept.

Referring to FIGS. 7 and 8, one first electrode 210-1 and one second electrode 220-1 are exemplarily illustrated.

The sensor driver 200C may output a transmission signal Tx through one first electrode 210-1. A mutual capacitance Cm may be formed between one first electrode 210-1 and one second electrode 220-1. By adding up a first reception signal Rxa and a second received signal Rxb which are received from one second electrode 220-1, the sensor driver 200C may sense an amount of change in the mutual capacitance Cm and may sense a coordinate.

According to an embodiment of the inventive concept, a closed loop C-LP may be defined in the sensor layer 200. The closed loop C-LP may include one second trace line 220*t*1 and a loop trace line RTL. The closed loop C-LP may overlap the charging coil CC. The charging coil CC may be a first charging coil CC-P (see FIG. 3A) or a second charging coil CC-M (see FIG. 3A).

According to an embodiment of the inventive concept, the closed loop C-LP may be provided in various shapes or sizes. For example, the shape, position, or size of the closed loop C-LP may be adjusted by adjusting the position of the loop trace line RTL and the position of an electrode to which the loop trace line RTL is connected. In this case, the degree of freedom regarding the position of the charging coil CC may be secured.

Electromagnetically induced interference noise may be generated in the sensor layer 200 by a magnetic field generated from the charging coil CC. According to an embodiment of the inventive concept, a noise current NS generated by electromagnetic induction of the charging coil CC may circulate in the closed loop C-LP and be dissipated as heat. That is, the noise current NS may not be transmitted to the sensor driver 200C. When the charging coil CC and the closed loop C-LP overlap each other, the noise current NS is dissipated as heat by the closed loop C-LP even when the electronic device 1000 is being wirelessly charged or the pen PN (see FIG. 1A) is being wirelessly charged. Therefore, the interference noise caused by an external magnetic field may be reduced. As a result, as a signal-to-noise ratio increases, the electronic device 1000 (see FIG. 1A) with improved sensing sensitivity may be provided.

FIG. 8 exemplarily explains that a signal-to-noise ratio increases when a change in mutual capacitance Cm between one first electrode 210-1 and one second electrode 220-1 is sensed, but the embodiment of the inventive concept is not particularly limited thereto. For example, even when a change in self-capacitance of each of one first electrode 210-1 and one second electrode 220-1 is sensed, the noise current NS may be dissipated as heat by the closed loop C-LP. Therefore, the interference noise caused by an external magnetic field may be reduced. As a result, as a signal-to-noise ratio increases, the electronic device 1000 (see FIG. 1A) with improved sensing sensitivity may be provided.

Figure 9:
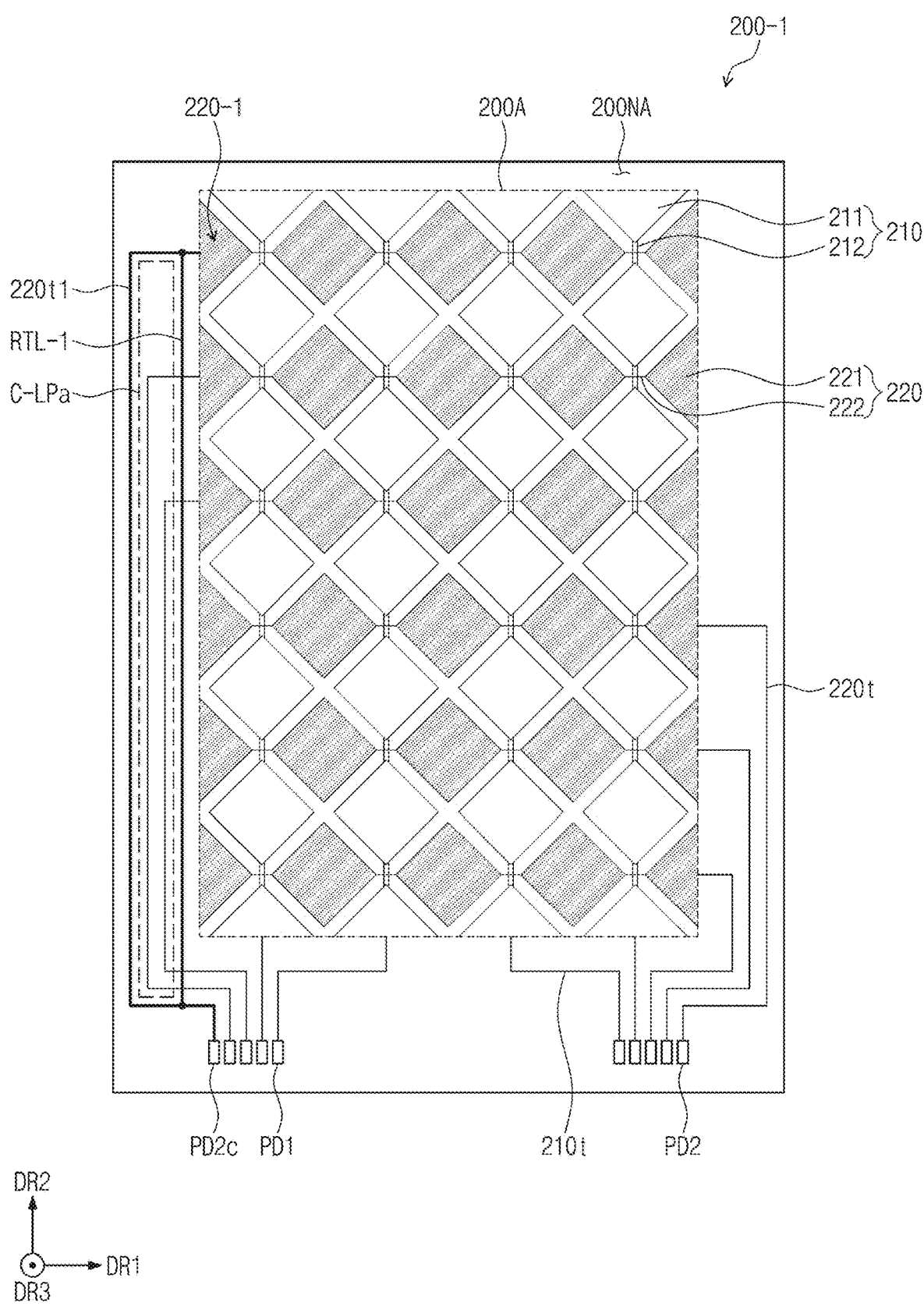
FIG. 9 is a plan view of a sensor layer according to an embodiment of the inventive concept.

FIG. 9 is a plan view of a sensor layer 200-1 according to an embodiment of the inventive concept. In explaining FIG. 9, the same reference numerals will be given to the same components as described in FIG. 7 and the descriptions thereof may be omitted.

Referring to FIGS. 8 and 9, a closed loop C-LPa may be defined in the sensor layer 200-1. The sensor layer 200-1 may further include a loop trace line RTL-1 electrically connected to one trace line 220*t*1 to define the closed loop C-LPa.

In an embodiment of the inventive concept, one second trace line 220*t*1 and a loop trace line RTL-1 may be disposed in the peripheral region 200NA. Accordingly, the closed loop C-LPa may overlap at least a portion of the peripheral region 200NA. One second trace line 220*t*1 may be spaced apart from the sensing region 200A with the loop trace line RTL-1 interposed therebetween.

In an embodiment of the inventive concept, the loop trace line RTL-1 may overlap at least some of the second trace lines 220*t*. For example, the second trace lines 220*t* may be included in the second conductive layer 204 (see FIG. 6A), and the loop trace line RTL-1 may be included in the first conductive layer 202 (see FIG. 6A). However, this is only an example and the embodiment of the inventive concept is not particularly limited thereto. For example, each of the second trace lines 220*t* may have a multi-layered structure including sub-lines included in each of the first conductive layer 202 and the second conductive layer 204 and may also have a single-layered structure only in a portion that overlaps the loop trace line RTL-1. That is, the loop trace line RTL-1 may be insulated from and cross overlapping second trace lines 220*t*.

According to an embodiment of the inventive concept, the closed loop C-LPa may include one second trace line 220*t*1 and a loop trace line RTL-1. The first charging coil (CC-P, see FIG. 3A) may overlap the closed loop C-LPa. In this case, a noise current NS generated by electromagnetic induction of the charging coil CC-P may circulate in the closed loop C-LPa and be dissipated as heat. That is, the noise current NS may not be transmitted to the sensor driver 200C. Therefore, interference noise caused by an external magnetic field may be reduced. As a result, as a signal-to-noise ratio increases, the electronic device 1000 (see FIG. 1A) with improved sensing sensitivity may be provided.

Figure 10:
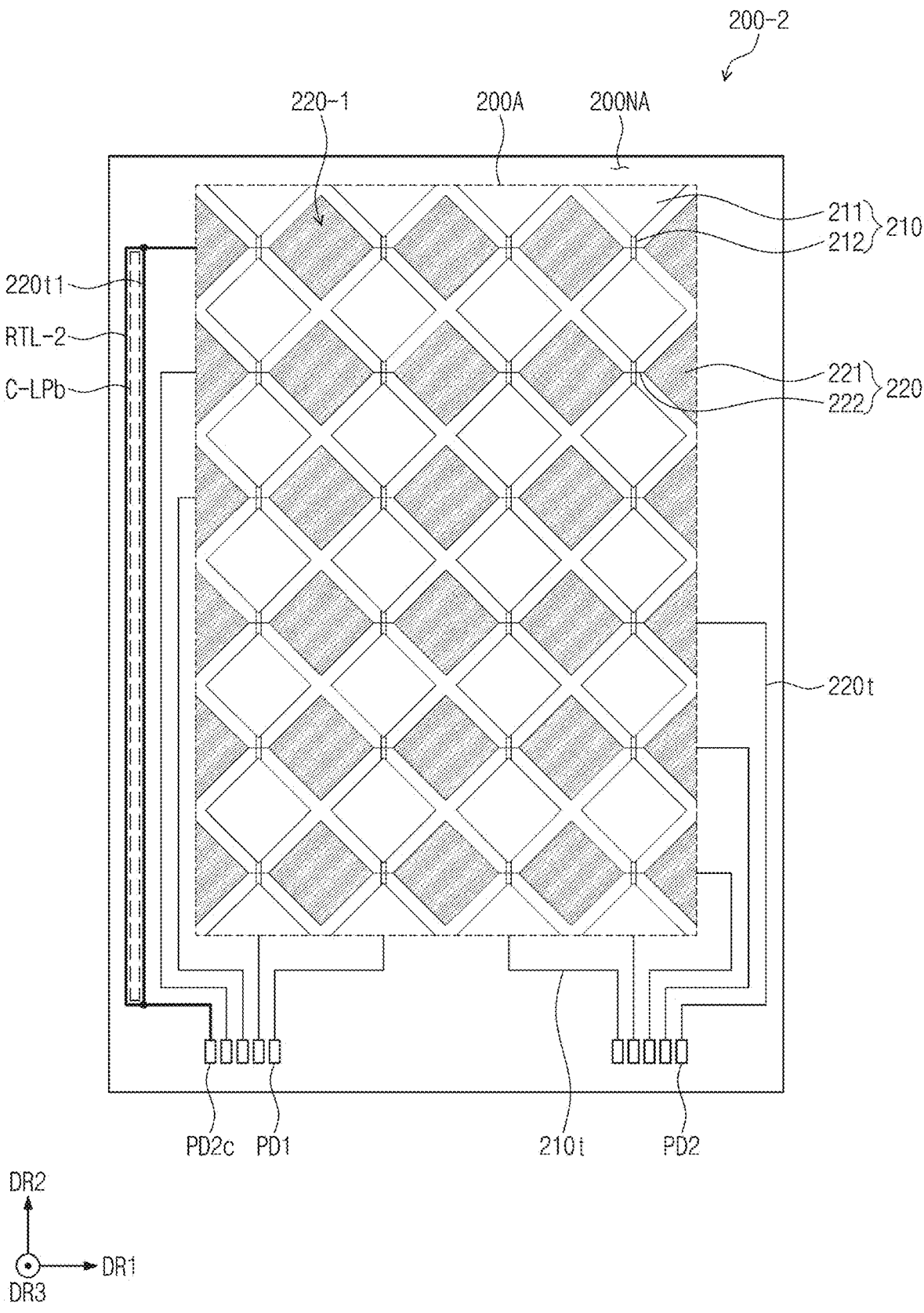
FIG. 10 is a plan view of a sensor layer according to an embodiment of the inventive concept.

FIG. 10 is a plan view of a sensor layer 200-2 according to an embodiment of the inventive concept. In describing FIG. 10, the same reference numerals will be given to the same components as described in FIG. 7 and the descriptions thereof may be omitted.

Referring to FIGS. 8 and 10, a closed loop C-LPb may be defined in the sensor layer 200-2. The sensor layer 200-2 may further include a loop trace line RTL-2 electrically connected to one trace line 220*t*1 to define the closed loop C-LPb.

In an embodiment of the inventive concept, one second trace line 220*t*1 and the loop trace line RTL-2 may be disposed in the peripheral region 200NA. Accordingly, the closed loop C-LPb may overlap at least a portion of the peripheral region 200NA. The loop trace line RTL-2 may be spaced apart from the sensing region 200A with one second trace line 220*t*1 interposed therebetween.

In an embodiment of the inventive concept, the loop trace line RTL-2 may not overlap the second trace lines 220*t*1. Accordingly, the loop trace line RTL-2 may be disposed on the same layer as the second trace lines 220*t*, may be disposed on a layer different from that of the second trace lines 220*t*, or may have the same stacked structure as the second trace lines 220*t*, for example, a multi-layered structure.

In an embodiment of the inventive concept, the loop trace line RTL-2 may overlap one second trace line 220*t*1. For example, the loop trace line RTL-2 may be included in the first conductive layer 202 (see FIG. 6A), and one second trace line 220*t*1 may be included in the second conductive layer 204 (see FIG. 6A). In this case, instead of being defined on a plane as illustrated in FIG. 10, the closed loop may be defined on a cross section parallel to the second direction DR2 and the third direction DR3.

According to an embodiment of the inventive concept, the first charging coil CC-P (see FIG. 3A) may overlap the closed loop C-LPb. In this case, a noise current NS generated by electromagnetic induction of the charging coil CC-P may circulate in the closed loop C-LPb and be dissipated as heat. That is, the noise current NS may not be transmitted to the sensor driver 200C. Therefore, interference noise caused by an external magnetic field may be reduced. As a result, as a signal-to-noise ratio increases, the electronic device 1000 (see FIG. 1A) with improved sensing sensitivity may be provided.

Figure 11:
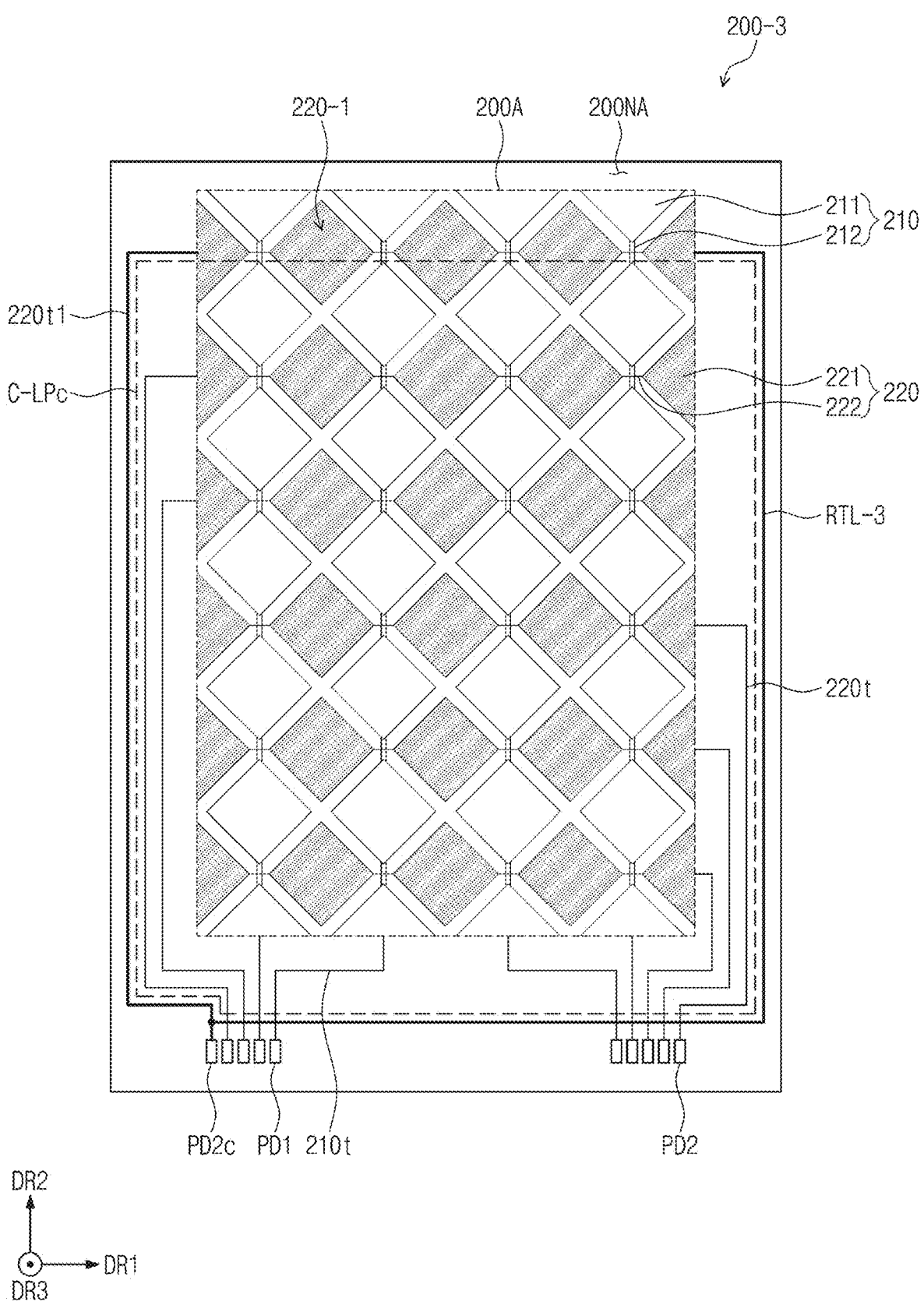
FIG. 11 is a plan view of a sensor layer according to an embodiment of the inventive concept.

FIG. 11 is a plan view of a sensor layer 200-3 according to an embodiment of the inventive concept. In describing FIG. 11, the same reference numerals will be given to the same components as described in FIG. 7 and the descriptions thereof may be omitted.

Referring to FIGS. 8 and 11, a closed loop C-LPc may be defined in the sensor layer 200-3. The sensor layer 200-3 may further include a loop trace line RTL-3 electrically connected to one trace line 220*t*1 to define the closed loop C-LPc.

In an embodiment of the inventive concept, one second trace line 220*t*1 and the loop trace line RTL-3 may be disposed in the peripheral region 200NA. One second trace line 220*t*1 may be spaced apart from the loop trace line RTL-3 with the sensing region 200A interposed therebetween. Accordingly, the closed loop C-LPc may overlap at least a portion of the peripheral region 200NA and at least a portion of the sensing region 200A.

According to an embodiment of the inventive concept, the first charging coil CC-P (see FIG. 3A) and the second charging coil CC-M (see FIG. 3A) may overlap the closed loop C-LPc. In this case, a noise current NS generated by electromagnetic induction of the first charging coil CC-P and the second charging coil CC-M may circulate in the closed loop C-LPc and be dissipated as heat. That is, the noise current NS may not be transmitted to the sensor driver 200C. Therefore, interference noise caused by an external magnetic field may be reduced. As a result, as a signal-to-noise ratio increases, the electronic device 1000 (see FIG. 1A) with improved sensing sensitivity may be provided.

Figure 12:
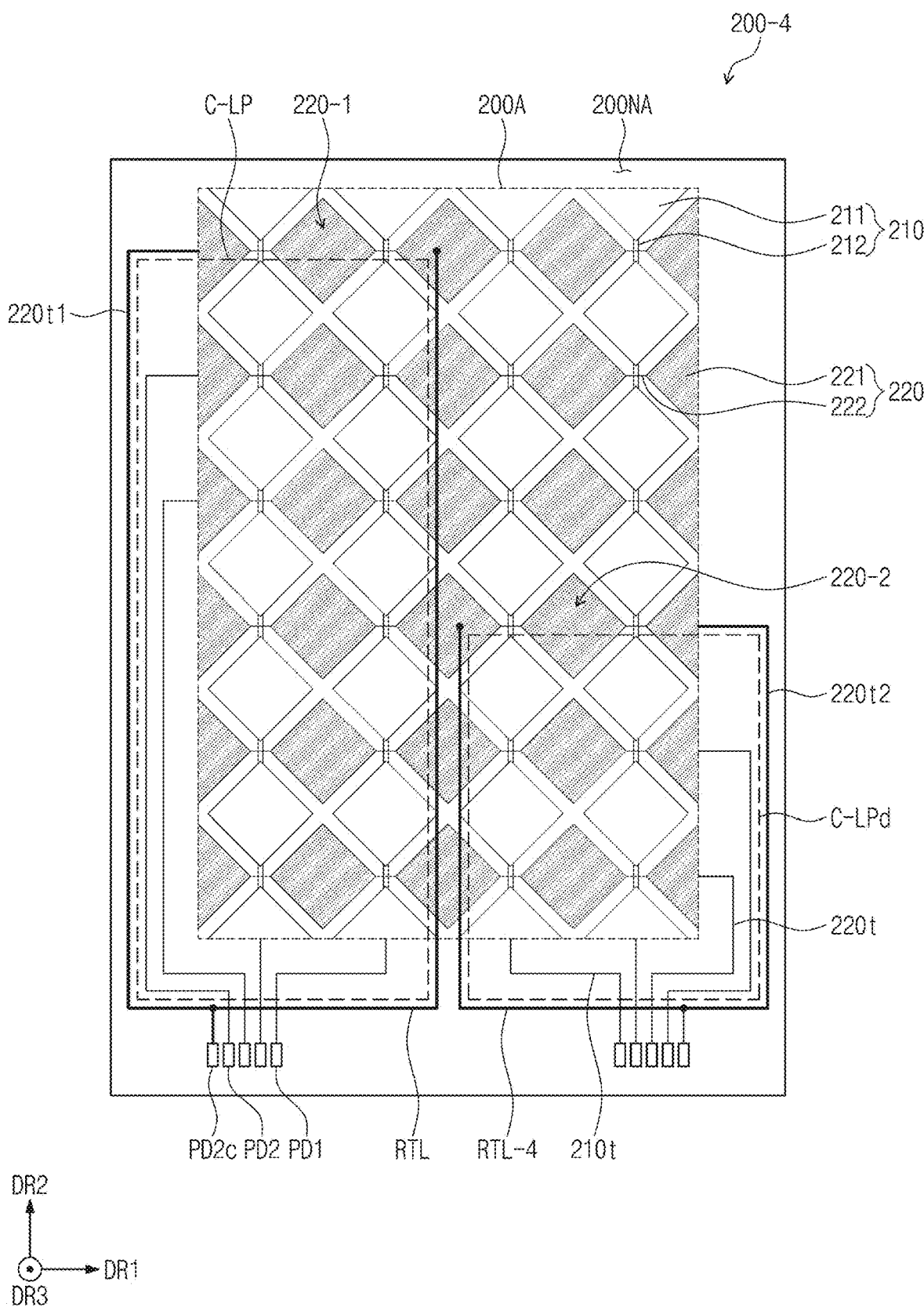
FIG. 12 is a plan view of a sensor layer according to an embodiment of the inventive concept.

FIG. 12 is a plan view of a sensor layer 200-4 according to an embodiment of the inventive concept. In describing FIG. 12, the same reference numerals will be given to the same components as described in FIG. 7 and the descriptions thereof may be omitted.

Referring to FIGS. 8 and 12, a closed loop C-LP (hereinafter referred to as first closed loop) and a second closed loop C-LPd may be defined in the sensor layer 200-4.

The sensor layer 200-4 may further include a loop trace line RTL (hereinafter referred to as first loop trace line) electrically connected to one trace line 220*t*1 to define the first closed loop C-LP and a second loop trace line RTL-4 electrically connected to another trace line 220*t*2 to define the second closed loop C-LPd. The first loop trace line RTL may be electrically connected to one second electrode 220-1, and the second loop trace line RTL-4 may be electrically connected to another second electrode 220-2.

The first loop trace line RTL and the second loop trace line RTL-4 may be disposed in the sensing region 200A and on the same layer as the bridge patterns 212. The first closed loop C-LP may include a portion of one second electrode 220-1 that may form the largest closed loop among the second electrodes 220 which are routed to the left. The second closed loop C-LPd may include a portion of another second electrode 220-2 that may form the largest closed loop among the second electrodes 220 which are routed to the right.

In an embodiment of the inventive concept, the first closed loop C-LP and the second closed loop C-LPd may not overlap each other, but the embodiment of the inventive concept is not particularly limited thereto. For example, the first closed loop C-LP and the second closed loop C-LPd may at least partially overlap each other.

According to an embodiment of the inventive concept, each of the first charging coil CC-P (see FIG. 3A) and the second charging coil CC-M (see FIG. 3A) may overlap at least one of the first closed loop C-LP and the second closed loop C-LPd. In this case, a noise current NS generated by electromagnetic induction of the first charging coil CC-P and the second charging coil CC-M may circulate in the first closed loop C-LP and the second closed loop C-LPd and be dissipated as heat. That is, the noise current NS may not be transmitted to the sensor driver 200C. Therefore, interference noise caused by an external magnetic field may be reduced. As a result, as a signal-to-noise ratio increases, the electronic device 1000 (see FIG. 1A) with improved sensing sensitivity may be provided.

Figure 13:
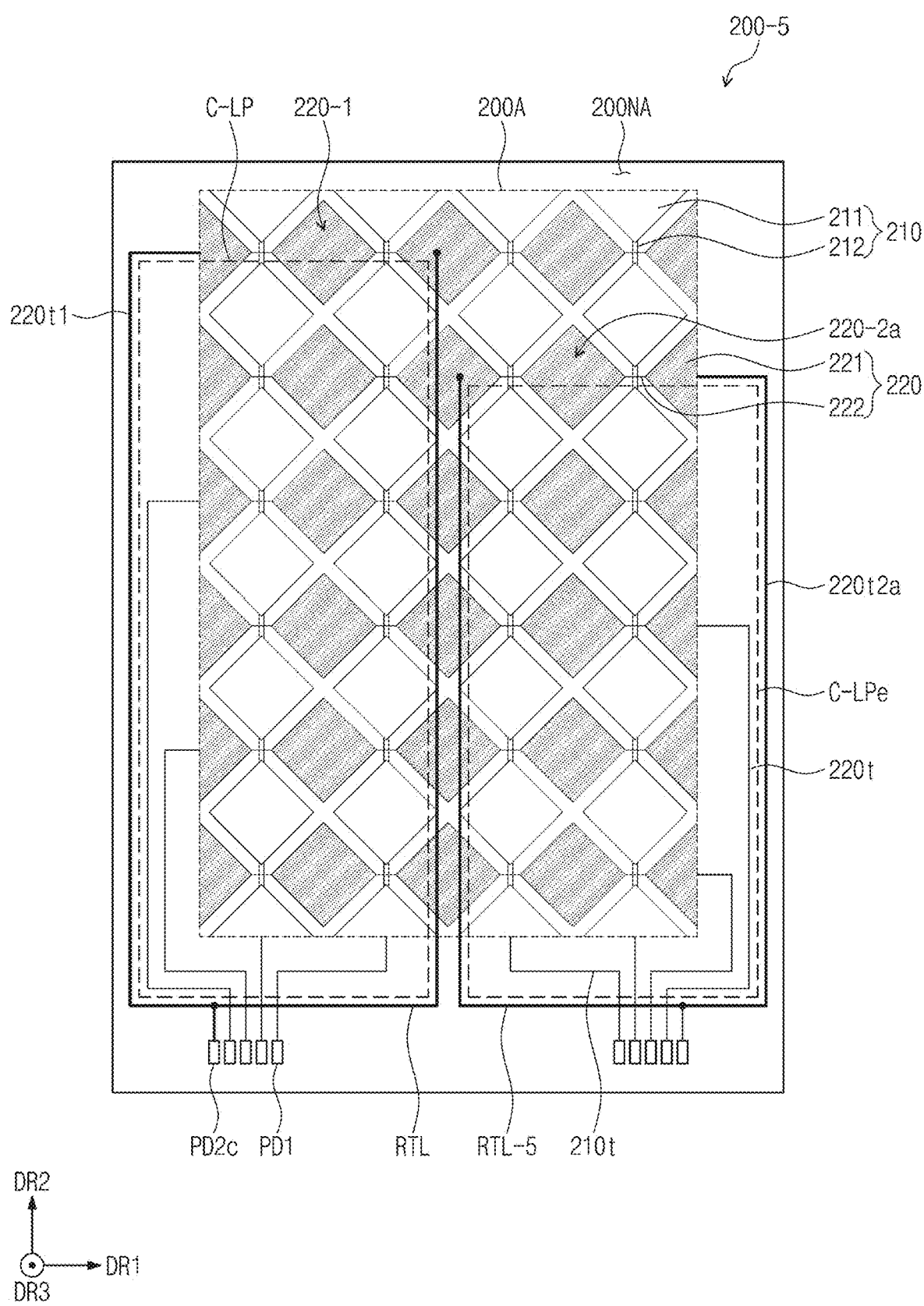
FIG. 13 is a plan view of a sensor layer according to an embodiment of the inventive concept.

FIG. 13 is a plan view of a sensor layer 200-5 according to an embodiment of the inventive concept. In describing FIG. 13, the same reference numerals will be given to the same components as described in FIG. 7 and the descriptions thereof may be omitted.

Referring to FIGS. 8 and 13, a closed loop C-LP (hereinafter referred to as first closed loop) and a second closed loop C-LPe may be defined in the sensor layer 200-5. The second closed loop C-LPe may have a larger size than the second closed loop C-LPd illustrated in FIG. 12. For example, the second electrodes 220 may be alternately routed to the left and right one by one. For example, among the second electrodes 220, one second electrode 220-1, which is positioned at the top and may form the largest closed loop, may be routed to the left and connected to one second trace line 220t1. Among the second electrodes 220, another second electrode 220-2a, which is positioned second from the top and may form the second largest closed loop, may be routed to the right and connected to another second trace line 220t2a.

In an embodiment of the inventive concept, the first closed loop C-LP and the second closed loop C-LPe may not overlap each other, but the embodiment of the inventive concept is not particularly limited thereto. For example, the first closed loop C-LP and the second closed loop C-LPe may at least partially overlap each other.

In an embodiment of the inventive concept, the sensor layer 200-5 may further include a loop trace line RTL (hereinafter referred to as first loop trace line) electrically connected to one trace line 220t1 to define the first closed loop C-LP and a second loop trace line RTL-5 electrically connected to another trace line 220t2 to define the second closed loop C-LPe. The first loop trace line RTL may be electrically connected to one second electrode 220-1, and the second loop trace line RTL-5 may be electrically connected to another second electrode 220-2a. The first loop trace line RTL and the second loop trace line RTL-5 may be disposed in the sensing region 200A and on the same layer as the bridge patterns 212.

According to an embodiment of the inventive concept, each of the first charging coil CC-P (see FIG. 3A) and the second charging coil CC-M (see FIG. 3A) may overlap at least one of the first closed loop C-LP and the second closed loop C-LPe. In this case, a noise current NS generated by electromagnetic induction of the first charging coil CC-P and the second charging coil CC-M may circulate in the first closed loop C-LP and the second closed loop C-LPe and be dissipated as heat. That is, the noise current NS may not be transmitted to the sensor driver 200C. Therefore, interference noise caused by an external magnetic field may be reduced. As a result, as a signal-to-noise ratio increases, the electronic device 1000 (see FIG. 1A) with improved sensing sensitivity may be provided.

Figure 14:
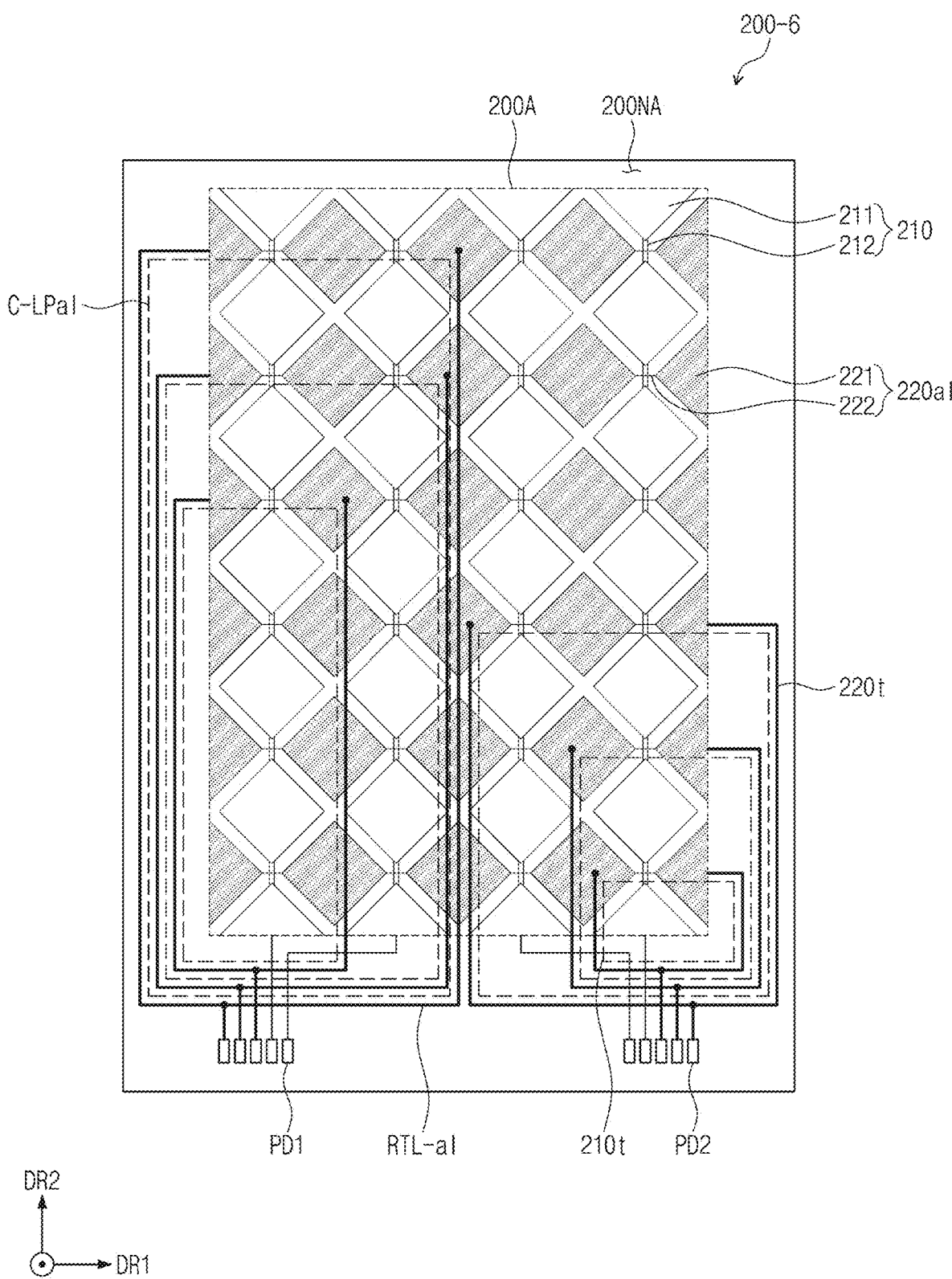
FIG. 14 is a plan view of a sensor layer according to an embodiment of the inventive concept.

FIG. 14 is a plan view of a sensor layer 200-6 according to an embodiment of the inventive concept. In describing FIG. 14, the same reference numerals will be given to the same components as described in FIG. 7 and the descriptions thereof may be omitted.

Referring to FIGS. 8 and 14, a plurality of closed loops C-LPal may be defined in the sensor layer 200-6. For example, the number of the closed loops C-LPal may correspond to the number of second electrodes 220al. The sensor layer 200-6 may include a plurality of loop trace lines RTL-al connected to each of the second electrodes 220al in a one-to-one correspondence.

In an embodiment of the inventive concept, the loop trace lines RTL-al may be provided to overlap the sensing region 200A. The plurality of closed loops C-LPal may have different sizes and overlap each other. However, this is only an example and the embodiment of the inventive concept is not particularly limited thereto. For example, each of the loop trace lines RTL-al may be disposed in the peripheral region 200NA as described in FIGS. 9, 10, and 11. In this case, at least some of the plurality of closed loops C-LPal may not overlap each other.

According to an embodiment of the inventive concept, each of the first charging coil CC-P (see FIG. 3A) and the second charging coil CC-M (see FIG. 3A) may overlap at least one of the plurality of closed loops C-LPal. In this case, a noise current NS generated by electromagnetic induction of the first charging coil CC-P and the second charging coil CC-M may circulate in each of the plurality of closed loops C-LPal and be dissipated as heat. That is, the noise current NS may not be transmitted to the sensor driver 200C. Therefore, interference noise caused by an external magnetic field may be reduced. As a result, as a signal-to-noise ratio increases, the electronic device 1000 (see FIG. 1A) with improved sensing sensitivity may be provided.

Figure 15:
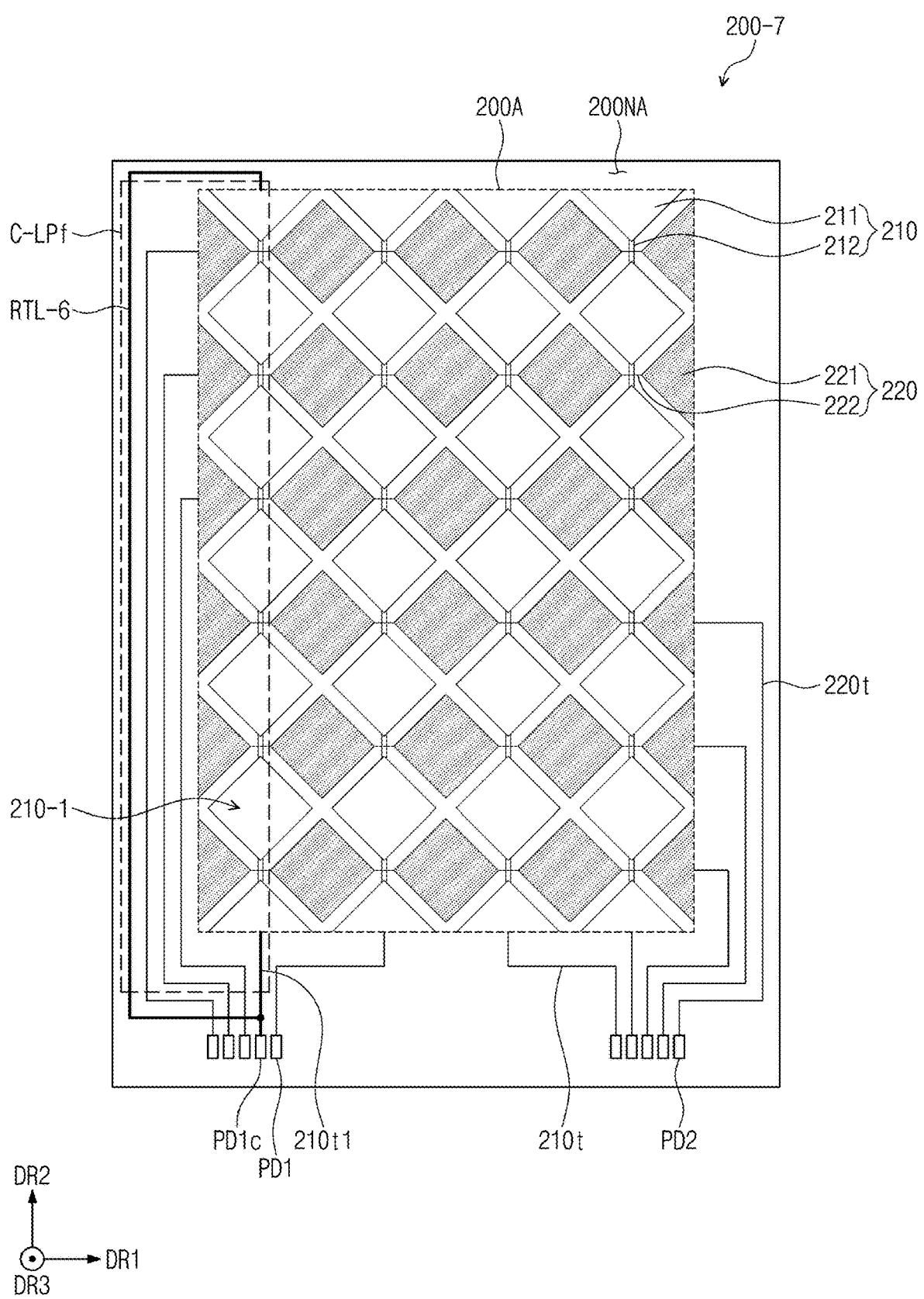
FIG. 15 is a plan view of a sensor layer according to an embodiment of the inventive concept.

FIG. 15 is a plan view of a sensor layer 200-7 according to an embodiment of the inventive concept. In describing FIG. 15, the same reference numerals will be given to the same components as described in FIG. 7 and the descriptions thereof may be omitted.

Referring to FIG. 15, a closed loop C-LPf including one trace line 220t1 among the first trace lines 210t and the second trace lines 220t may be defined in the sensor layer 200-7. For example, the sensor layer 200-7 may further include a loop trace line RTL-6 electrically connected to one trace line 210t1 to define the closed loop C-LPf.

In an embodiment of the inventive concept, the sensor layer 200-7 may further include a loop trace line RTL-6 electrically connected to one first electrode 210-1 among the plurality of first electrodes 210. Accordingly, the closed loop C-LPf, which includes one first electrode 210-1, one first trace line 210t1 electrically connected to the one first electrode 210-1, and the loop trace line RTL-6, may be defined in the sensor layer 200-7. One first trace line 210t1 and the loop trace line RTL-6 may be electrically connected to one first pad PD1c.

In an embodiment of the inventive concept, the first pads PD1 and the second pads PD2 may be arranged along the first direction DR1. In addition, one first electrode 210-1 may extend along the second direction DR2. That is, the closed loop C-LPf electrically connected to one first electrode 210-1 extending in a direction crossing the arrangement direction of the first and second pads PD1 and PD2 may be defined.

According to an embodiment of the inventive concept, the first charging coil CC-P (see FIG. 3A) may overlap the closed loop C-LPf. In this case, a noise current generated by electromagnetic induction of the charging coil CC-P may circulate in the closed loop C-LPf and be dissipated as heat.

That is, the noise current NS may not be transmitted to the sensor driver 200C. Therefore, interference noise caused by an external magnetic field may be reduced. As a result, as a signal-to-noise ratio increases, the electronic device 1000 (see FIG. 1A) with improved sensing sensitivity may be provided.

According to the above description, a closed loop may be defined in the sensor layer, and the closed loop may overlap the charging coil of the electronic device. In this case, a noisy current caused by the charging coil may circulate in the closed loop and be dissipated as heat energy. Therefore, interference noise caused by an external magnetic field may be reduced. As a result, as a signal-to-noise ratio increases, the electronic device with improved sensing sensitivity may be provided.

Although embodiments of the present inventive concepts have been described, various modifications and similar arrangements of such embodiments will be apparent to a person of ordinary skill in the art. Accordingly, the inventive concepts are not limited to such embodiments, but rather to the scope and spirit of the appended claims.

What is claimed is:

1. An electronic device comprising:
a sensor layer including a sensing region and a peripheral region adjacent to the sensing region defined therein,
wherein the sensor layer comprises:
a plurality of first electrodes disposed in the sensing region and arranged along a first direction;
a plurality of second electrodes disposed in the sensing region and arranged along a second direction crossing the first direction;
a plurality of first trace lines electrically connected to the plurality of first electrodes in a one-to-one correspondence;
a plurality of second trace lines electrically connected to the plurality of second electrodes in a one-to-one correspondence;
a first loop trace line electrically connected to one second electrode among the plurality of second electrodes;
a display layer disposed below the sensor layer; and
a charging coil disposed below the display layer,
wherein a first closed loop includes one second trace line among the plurality of second trace lines connected to the one second electrode,
wherein the first loop trace line is defined in the sensor layer, and
wherein the charging coil overlaps the first closed loop.

2. The electronic device of claim 1, wherein the one second trace line and the first loop trace line are electrically connected to one pad.

3. The electronic device of claim 1, wherein the one second trace line is disposed in the peripheral region, and the first loop trace line is disposed in the sensing region.

4. The electronic device of claim 1, wherein the one second trace line and the first loop trace line are disposed in the peripheral region.

5. The electronic device of claim 1, wherein the one second trace line is spaced apart from the sensing region with the first loop trace line interposed therebetween.

6. The electronic device of claim 1, wherein the one second trace line is spaced apart from the first loop trace line with the sensing region interposed therebetween.

7. The electronic device of claim 1, wherein:
the sensor layer further comprises a second loop trace line electrically connected to another second electrode among the plurality of second electrodes; and a second closed loop is defined by a second trace line among the plurality of second trace lines connected to the another second electrode, the another second electrode, and the second loop trace line.

8. The electronic device of claim 1, wherein the sensor layer further comprises a plurality of pads electrically connected to the plurality of first trace lines and the plurality of second trace lines,
wherein the plurality of pads are arranged along the first direction.

9. The electronic device of claim 1, wherein the one second electrode extends along the first direction.

10. The electronic device of claim 1, wherein the sensor layer further comprises a plurality of pads electrically connected to the plurality of first trace lines and the plurality of second trace lines,
wherein the one second electrode extends in a direction crossing an arrangement direction of the plurality of pads.

11. The electronic device of claim 1, wherein the first loop trace line is disposed on a layer different from that of the plurality of second trace lines.

12. An electronic device comprising:
a display panel comprising a display layer configured to display an image, and a sensor layer disposed on the display layer and including a sensing region and a peripheral region adjacent to the sensing region, which are defined therein; and
a charging coil disposed below the display panel,
wherein the sensor layer comprises:
a plurality of first electrodes disposed in the sensing region and arranged along a first direction;
a plurality of second electrodes disposed in the sensing region and arranged along a second direction crossing the first direction; and
a plurality of trace lines connected to the plurality of first electrodes and the plurality of second electrodes in a one-to-one correspondence,
wherein a closed loop including one trace line among the plurality of trace lines is defined in the sensor layer.

13. The electronic device of claim 12, wherein the closed loop overlaps the charging coil.

14. The electronic device of claim 12, wherein:
the sensor layer further comprises a loop trace line electrically connected to the one trace line; and
the closed loop includes the loop trace line.

15. The electronic device of claim 14, wherein:
the one trace line is disposed in the peripheral region; and
the loop trace line is disposed in the sensing region.

16. The electronic device of claim 14, wherein the one trace line is spaced apart from the sensing region with the loop trace line interposed therebetween.

17. The electronic device of claim 14, wherein the one trace line is spaced apart from the loop trace line with the sensing region interposed therebetween.

18. An electronic device comprising:
a display panel comprising a display layer and a sensor layer disposed on the display layer; and
a charging coil disposed below the display panel,
wherein the sensor layer comprises:
a plurality of first electrodes arranged along a first direction;
a plurality of second electrodes arranged along a second direction crossing the first direction; and
a loop trace line electrically connected to one electrode among the plurality of first electrodes and the plurality of second electrodes, wherein:

a closed loop overlapping the charging coil is defined in the sensor layer; and the closed loop includes the loop trace line.

19. The electronic device of claim 18, wherein:

the sensor layer further comprises a plurality of first trace lines electrically connected to the plurality of first electrodes in a one-to-one correspondence and a plurality of second trace lines electrically connected to the plurality of second electrodes in a one-to-one correspondence; and the closed loop further comprises a trace line among the plurality of first trace lines and the plurality of second trace lines electrically connected to the one electrode.

* * * * *